(12) United States Patent
Poor et al.

(10) Patent No.: US 7,564,426 B2
(45) Date of Patent: Jul. 21, 2009

(54) LOCATION SENSITIVE DISPLAY DEVICE, SYSTEM, AND METHOD OF PROVIDING ANIMATION SEQUENCES

(75) Inventors: Kyle W. Poor, Orlando, FL (US); Roger S. Holzberg, Burbank, CA (US); Paul H. Dietz, Hopkinton, MA (US); Lawrence P. Stein, Windermere, FL (US); Robert Swirsky, Sunnyvale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 10/476,336

(22) PCT Filed: Apr. 30, 2002

(86) PCT No.: PCT/US02/13790

§ 371 (c)(1),
(2), (4) Date: Aug. 13, 2004

(87) PCT Pub. No.: WO02/088905

PCT Pub. Date: Nov. 7, 2002

(65) Prior Publication Data

US 2004/0263494 A1 Dec. 30, 2004

Related U.S. Application Data

(60) Provisional application No. 60/287,769, filed on Apr. 30, 2001.

(51) Int. Cl.
*G09G 3/16* (2006.01)
(52) U.S. Cl. .......................................... 345/48; 362/800

(58) Field of Classification Search ............. 345/48–51, 345/44–46, 156; 463/51, 53, 2, 3, 5, 7, 30–31, 463/37, 49–57; 705/14, 26, 27; 362/800, 362/103, 106, 105
See application file for complete search history.

(56) References Cited

U.S. PATENT DOCUMENTS 3,770,271 A * 11/1973 Kim ............................... 463/6
4,672,230 A *  6/1987 Spahn ........................ 307/116

(Continued)

FOREIGN PATENT DOCUMENTS

EP           0915452           5/1999

(Continued)

*Primary Examiner*—Amr Awad
*Assistant Examiner*—Stephen G Sherman
(74) *Attorney, Agent, or Firm*—Greenberg Traurig, LLP

(57) ABSTRACT

A location sensitive display device, and method therefor utilized in an entertainment environment. The display device includes a receiver, control circuit, and indication units. Infrared (IR) transmitters are positioned within the entertainment environment and emit a code which is detected and decoded by the receiver or IR photodiode. The receiver generates a control signal in response to the transmitted IR signal, and a control circuit processes the control signal to generate output signals which illuminate Light Emitting Diode (LED) indication units in a sequence determined by the output signals to provide a predetermined visual display. The display can be used in an activity related to the entertainment environment and can be controlled by a user or a central control system. Further, the display device can include a Liquid Crystal Display (LCD) screen to provide various types of games including games of skill and trivia games with questions and answers.

111 Claims, 19 Drawing Sheets

U.S. PATENT DOCUMENTS

| | | | |
|---|---|---|---|
| 5,214,793 A | 5/1993 | Conway et al. | 455/49.1 |
| 5,461,371 A | 10/1995 | Matsumoto et al. | 340/825.25 |
| 5,715,243 A | 2/1998 | May | |
| 5,797,125 A | 8/1998 | Hirohama | 704/277 |
| 5,921,674 A * | 7/1999 | Koczi | 362/800 |
| 6,293,869 B1 | 9/2001 | Kwan et al. | |
| 6,491,516 B1 * | 12/2002 | Tal et al. | 431/253 |
| 6,573,824 B1 * | 6/2003 | Lovegreen et al. | 340/7.1 |
| 6,587,835 B1 * | 7/2003 | Treyz et al. | 705/14 |
| 6,792,292 B1 * | 9/2004 | Chatani | 455/566 |
| 6,792,294 B1 * | 9/2004 | Kushita | 455/566 |
| 6,850,781 B2 * | 2/2005 | Goto | 455/566 |
| 6,928,468 B2 * | 8/2005 | Leermakers | 709/221 |
| 2002/0086711 A1 * | 7/2002 | Flannery | 455/566 |
| 2002/0158922 A1 | 10/2002 | Clark et al. | |
| 2003/0214259 A9 * | 11/2003 | Dowling et al. | 315/312 |

FOREIGN PATENT DOCUMENTS

JP    06-57511    3/1994

* cited by examiner

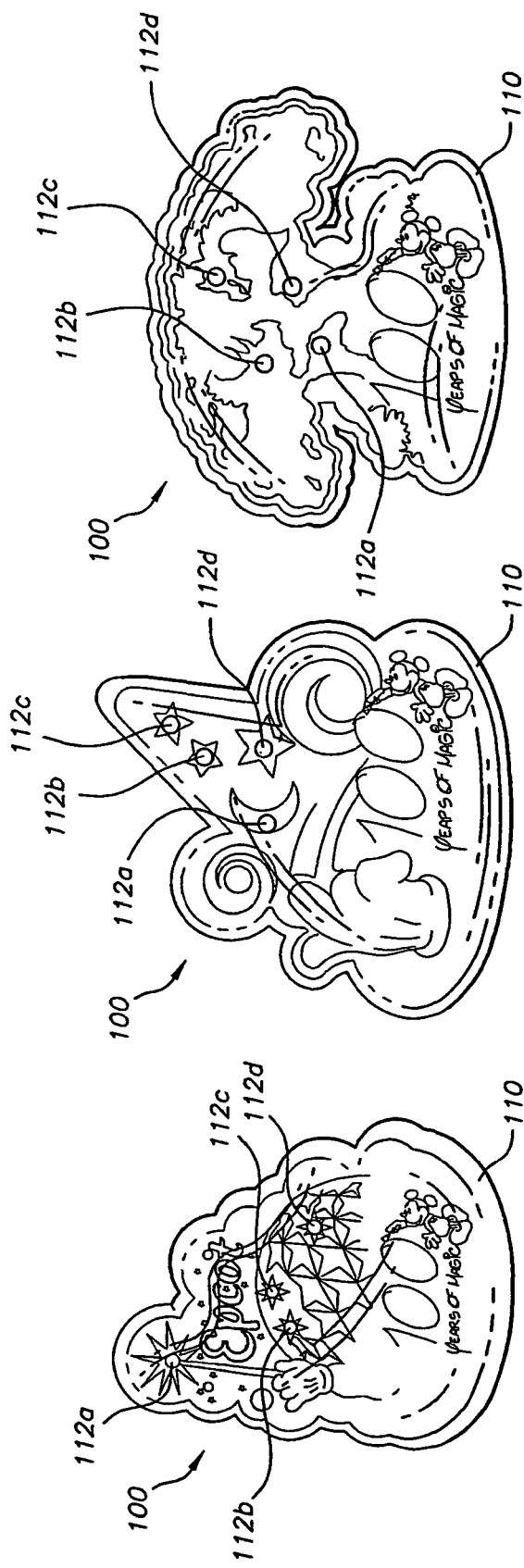

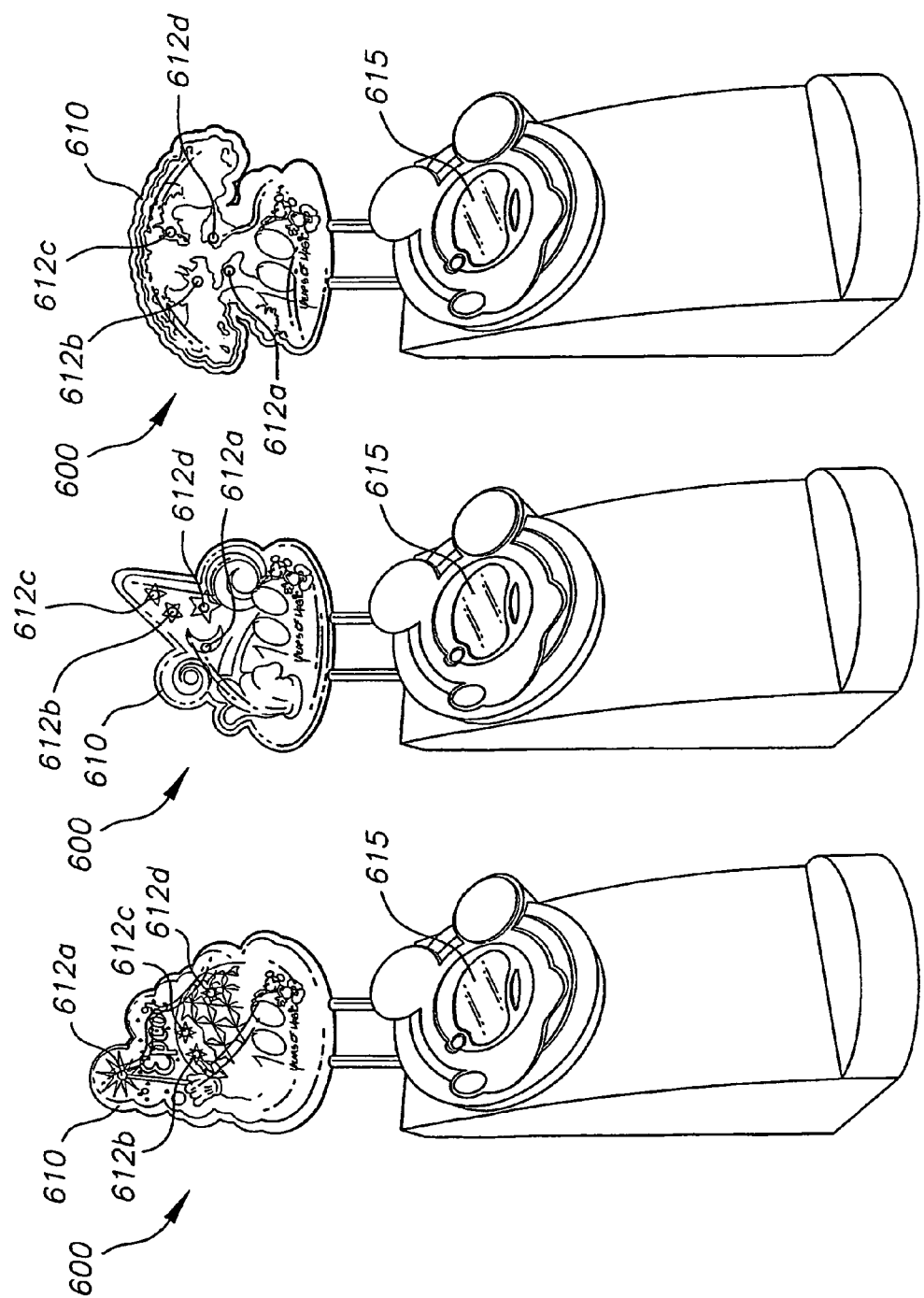

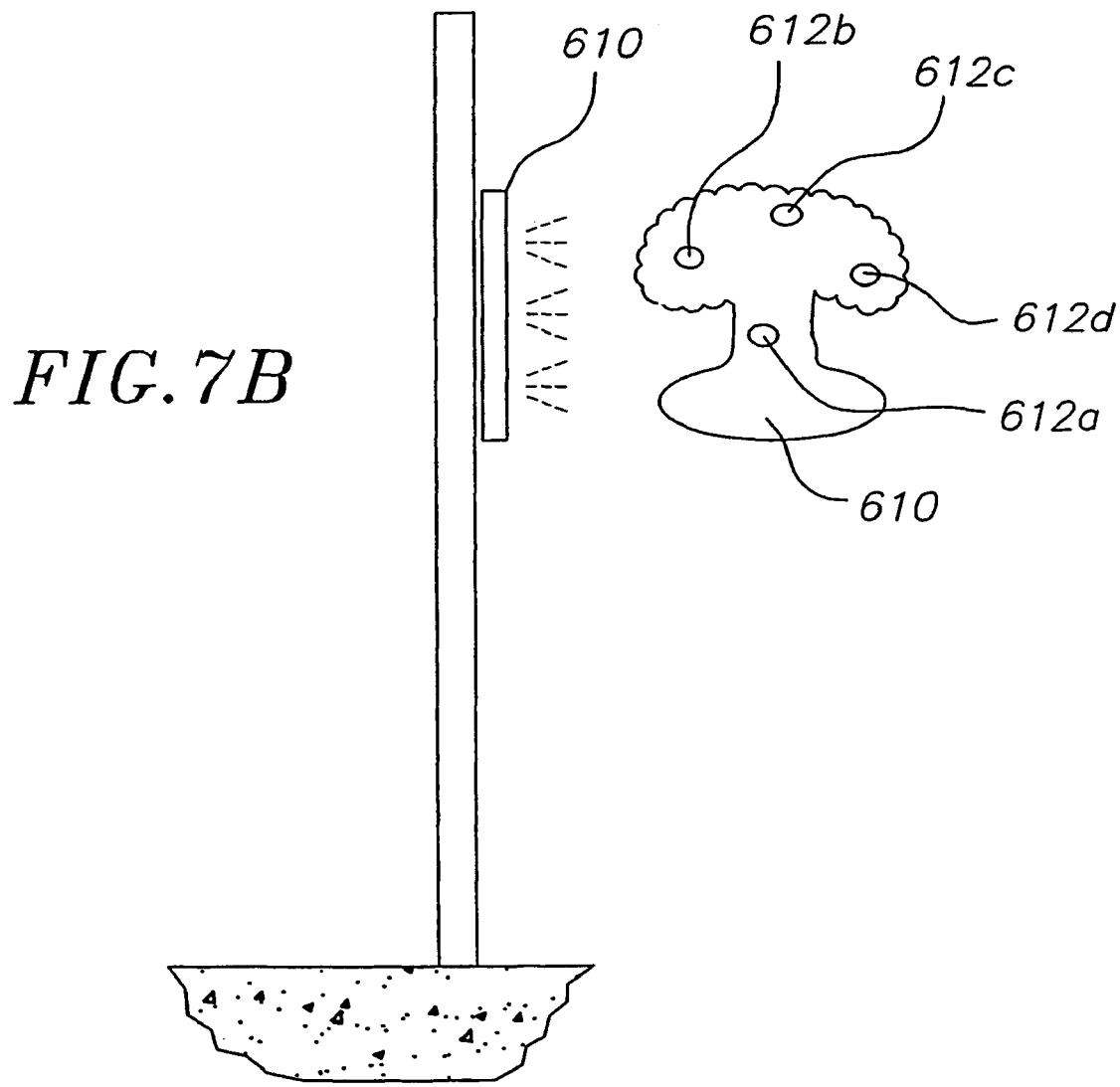

LOCATION SENSITIVE DISPLAY DEVICE, SYSTEM, AND METHOD OF PROVIDING ANIMATION SEQUENCES

CROSS-REFERENCE TO RELATED APPLICATION

This application claims priority from U.S. Provisional Application No. 60/287,769, filed on Apr. 30, 2001, and entitled "SYSTEM AND METHOD OF DISPLAYING ANIMATION SEQUENCES UTILIZING A LOCATION SENSITIVE NOVELTY BUTTON."

FIELD OF THE INVENTION

The present invention relates generally to objects, and more particularly, to a location sensitive display device that provides a display in response to transmitters located throughout an entertainment environment such as a theme park or resort.

DESCRIPTION OF RELATED ART

Conventional mobile devices for playing location-dependent pre-recorded messages are known. For example, when a person carrying a mobile device comes within range of a transmitter with a pre-recorded message, the mobile device plays the message. One such mobile device is installed in a push-cart in a supermarket. When the push-cart is within range of a stationary transmitter, the pre-recorded message is sent to the mobile device. The message can be a special discount offer for a particular product on a shelf nearby or an advertisement for a brand. The mobile device plays the same message for each shopper to hear when the device comes within range of the transmitter. The device can also be used in public galleries and parks for educational purposes, carried by a person, and connected to earphones to enable the person to hear the transmitted message without disturbing other people.

These conventional systems, however, are primarily directed to simple applications for providing information or advertisements. Thus, once the mobile device completes the message, the session is completed.

Further, the shopper has no control over the delivery of the message as the message is delivered and played automatically.

These conventional devices are not suitable for applications where it is desired to use the device as part of an activity, show, or display, particularly where these events are conducted or performed on a larger scale in an entertainment environment.

In addition, in an entertainment environment, a guest will often purchase a souvenir as a token of remembrance of their visit. However, such souvenirs are typically inactive objects which do not engage or entertain guests within the entertainment environment.

A need exists for an object or souvenir; such as a button, pin, or similar object to serve as a display device. The display device includes a system and method for providing visual and audible animation sequences. These animation sequences are presented through use of an illuminated LED, an LED having a change in brightness, a plurality of LEDs illuminated in a sequence or pattern, a blinking pattern, or sounds provided by a speaker or buzzer playing different sounds such as musical notes or through other visual displays (e.g., a Liquid Crystal Display or LCD screen). These sequences can be coordinated in response to the device's location in space and time within an exhibit, display, theater, presentation, attraction, or proximity to other similar devices, to enhance the guest's experience in the entertainment environment. Further, it is desirable to enable the sequences to be controllable by the guest. A need also exists for a system, and method therefor, for coordinating the sequences displayed on the display device.

SUMMARY OF THE INVENTION

The present invention provides an item, system and method of providing and enhancing an experience within an entertainment environment such as, for example, a theme park, resort, cruise ship, hotel, or educational setting.

According to the present invention, a display device includes a display base with indication units, a receiver-decoder, and a programmable control circuit with one or more stored programs. The receiver-decoder detects coded signals from a transmitter in an entertainment environment and provides a control signal to the programmable control circuit. The control circuit generates a sequence of output signals which activate the indication units, such as an LED or LCD display, of the display device to illuminate in a predetermined visual display.

In further accordance with the invention, the display device is an object that a person can wear as an item of adornment.

In yet further accordance with the invention, communications between the transmitter and receiver-decoder can be infrared (IR) communications.

Also in accordance with the present invention, the output is synchronized with an event or attraction such as a parade or fireworks show, or can serve as the basis for allocating benefits such as reduced wait times for attractions and merchandise discounts.

In still further accordance with the present invention, a proximity switch is incorporated into the display device to provide a user the ability to control the animation sequences.

In further accordance with the present invention, a central control system can program one or more transmitters to synchronize the output of the display device with another display or event in the entertainment environment. A serial signal is sent to a transmitter over a serial data link, converted into an IR signal by a transmitter controller, and transmitted by a transmission circuit. As a result, the animation sequence is coordinated by a central control system.

In further accordance with the invention, the display devices are capable of communicating with other similar devices creating group interactions and games between multiple users. This communication can also be used to activate other equipment or visual displays within the entertainment environment.

In still further accordance with this invention, the display device presents visual interactive displays or text on an LCD screen. These interactive displays are presented both in response to the devices' location in space and time within the entertainment environment and also in response to the input from the user through buttons and/or proximity switch. The interactive displays can take the form of games of skill or knowledge and the performance of the user is measured by keeping a score or record of their performance. Using the communication feature between the devices, the best scores from each device can be compared and stored as part of a large multi-player game within the entertainment environment.

BRIEF DESCRIPTION OF THE DRAWINGS

FIGS. 1A-C illustrate the general form and appearance of example location sensitive display devices;

FIGS. 6A-C illustrate example information booths or kiosks which include an IR transmitter;

FIGS. 7A-C illustrate different designs and applications of information booths or kiosks that can interact with a location sensitive button;

DETAILED DESCRIPTION

In the following description of embodiments of the invention, reference is made to the accompanying drawings which form a part hereof, and which is shown by way of illustration specific embodiments in which the invention may be practiced. It is to be understood that other embodiments may be utilized as structural changes may be made without departing from the scope of the present invention.

Referring to FIGS. 1A-C, a display device 100 can be designed with different shapes, sizes, and decor relating to an entertainment environment. The display device 100 includes a display base 110 with one or more indication units 112 which illuminate when activated, e.g., Light Emitting Diodes (LEDs) 112a-d (referred to LEDs 112 for simplicity) as illustrated in FIGS. 1A-C, or a Liquid Crystal Display (LCD) in other device embodiments. The LEDs 112 of the embodiment illustrated in FIGS. 1A-C are illuminated to provide an animation sequence or other display in connection with an activity or experience in the entertainment environment.

Figures 2A, 2B, 2C:
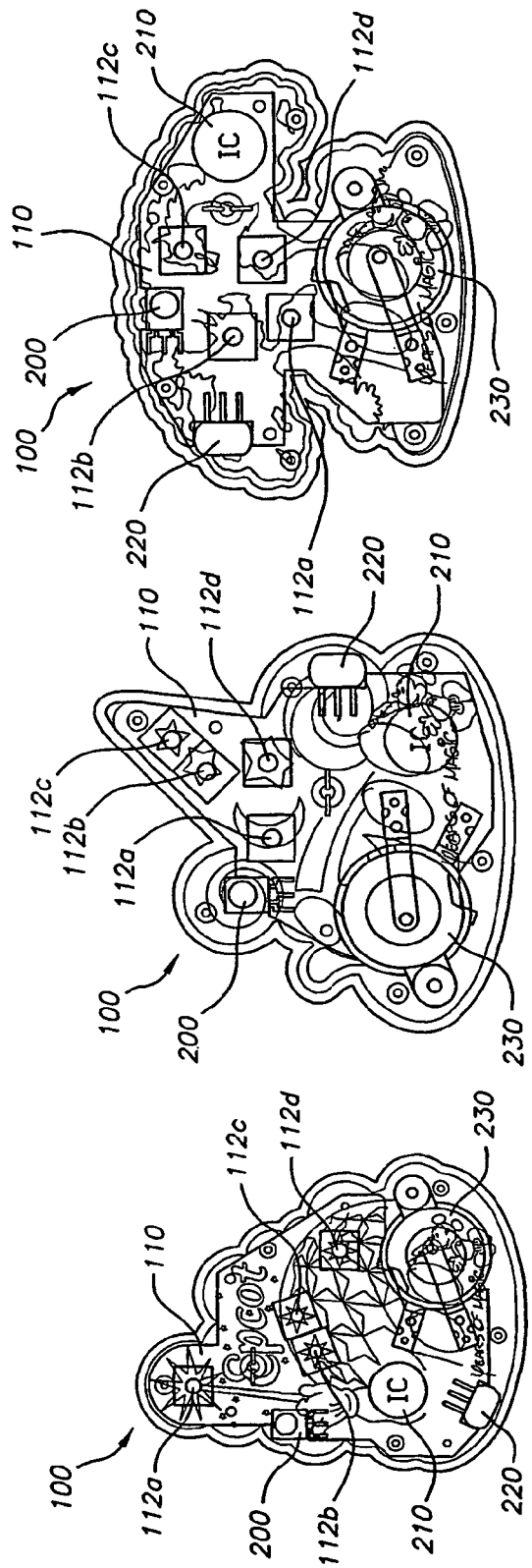
FIGS. 2A-C illustrate additional circuit components in the example buttons of FIGS. 1A-C.

FIGS. 2A-C illustrate additional components of the display device 100 using LEDs. In addition to the display base 110 with LEDs 112, the device 100 includes a receiver-decoder unit 200, a programmable control circuit 210 with programs stored therein, a clock or resonator 220 which drives the control circuit 210, and battery 230 which provides power to these components.

The receiver-decoder 200 monitors and detects coded signals at a particular frequency or frequency range which are emitted by one or more transmitters in the entertainment environment. The receiver-decoder decodes the signal and provides a control signal to the control circuit. The program (s) stored within the control circuit directly result in the generation of a sequence of output signals. The output signals activate the indication units 112, which provide a predetermined visual display corresponding to the program stored within the control circuit. The visual display can be used in an activity in the entertainment environment.

Figure 3:
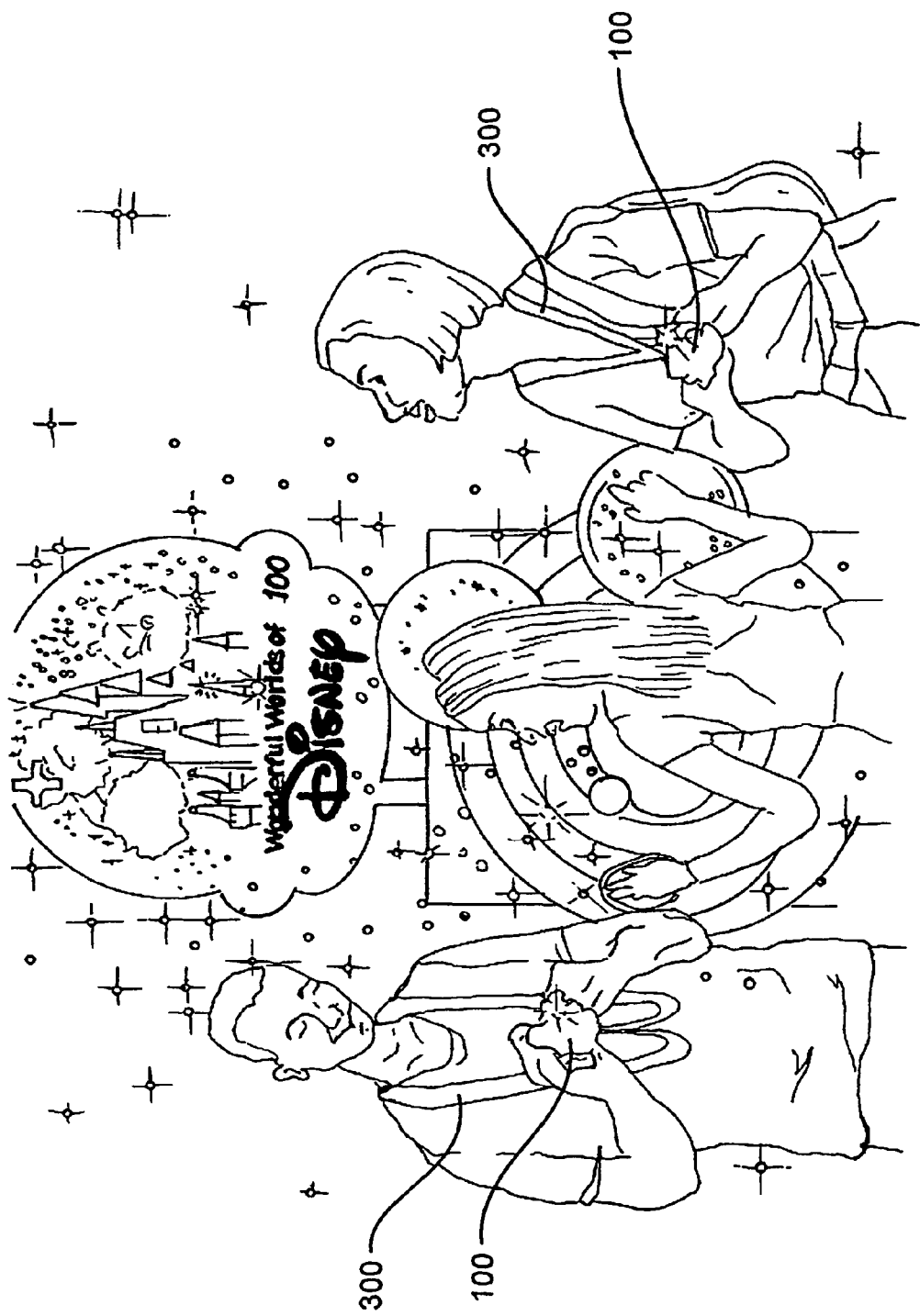
FIG. 3 illustrates a location sensitive button secured to a guest by a strap or necklace.

As one skilled in the art will appreciate, the display device 100 can assume many different forms in addition to a button. For example, the device 100 can be incorporated into a pin, toy (e.g., plush toy), or other item or souvenir that can be worn on the clothing of the guest as an item of adornment, or otherwise secured as a bracelet or necklace 300 as illustrated in FIG. 3. As a further example, the device 100 can be incorporated into an article of clothing such as a hat or jacket or built into a hand-held prop such as a magic wand. These devices 100 can also have various decorative designs. For simplicity, this specification refers to and illustrates a device in the form of a pin or button 100, but is clearly not so limited.

Further, those skilled in the art will recognize that the button 100 can be used in many different entertainment environments, e.g., a theme park, resort, hotel, cruise ship, or educational setting. However, for simplicity, this specification refers to a location sensitive button used within a theme park as an example.

Referring back to FIGS. 2A-C, one example button 100 design includes a display base 110 with 4 LEDS or indication units 112a-d. Alternatively, the button can have different numbers of LEDs, e.g., 10-15 LEDs, for more involved activities as later described. As the guest moves through the park during the day, the LEDs are activated and used as part of activities in the park.

When the button 100 is initially purchased, the control circuit is inactive. When electrical power is initially applied to the device, the control circuit is reset and an initial visual display is produced. Once active, the control circuit monitors the output of the receiver-decoder 200 to determine if any coded signals from any transmitters in the vicinity are detected. Based on the information contained in the coded signals and the programming stored within the programmable control circuit 210, the button 100 will respond with the desired visual display.

Specially coded signals can also be sent to the button 100 to force the control circuit to reset. Other specially coded signals can be sent forcing the control circuit to enter a low-power consumption or "sleep" mode. Similar signals can also be sent forcing the control circuit to emerge from "sleep" mode and remain active within the entertainment environment. By managing the signals sent to the devices as they are brought into the entertainment environment, (e.g. through the entrance turnstiles) the devices will be in a known and controlled state. Furthermore, as the devices leave the entertainment environment, their state can also be controlled to conserve battery power until their next visit. The LEDs 112 can be the same or different colors (e.g., white, red, yellow, green, blue). The electrical components within the button 100 trigger programs stored in the control circuit 210 in response to output signals which activate and illuminate the LEDs in a predetermined visual display or animation sequence. For example, the animation sequence can be an illuminated LED, or different numbers of LEDs illuminated in various patterns and sequences, e.g., blinking patterns, chase sequences, and dimming control of LEDs, etc. to fit the designed effect, or can be a game display in response to a location within the entertainment environment.

The button 100 can also include a speaker (not shown) which plays sounds or a song in, e.g. a character's voice, separately or in combination with the illumination of one or more LEDs. However, for purposes of illustration, the button is primarily discussed in connection with animation sequences produced by LEDs.

Figure 4A:
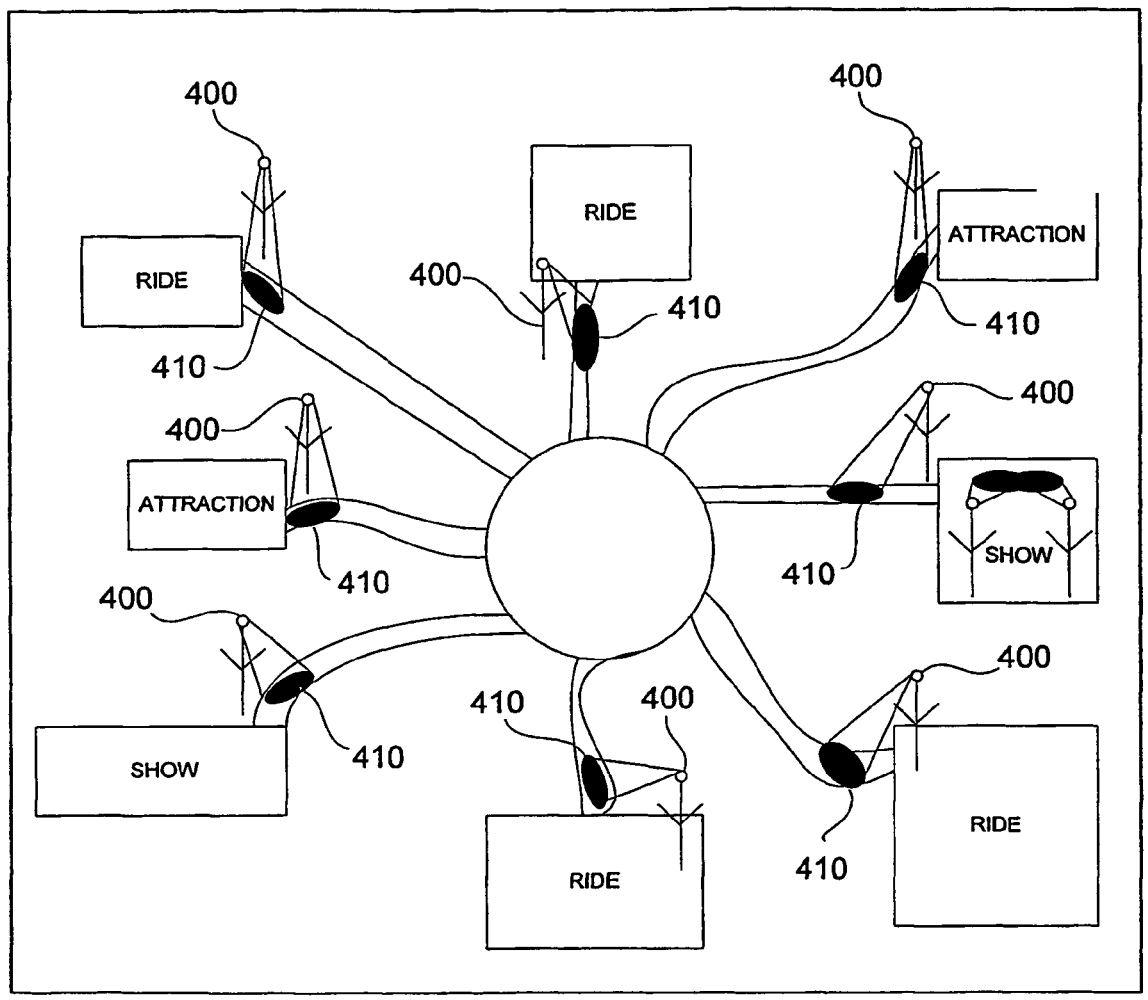
FIGS. 4A-C are simplified and generalized views of an entertainment environment illustrating possible transmitter locations.

Referring to FIG. 4A, the transmitters (e.g., IR transmitters) 400 can be mounted to, near, or in attractions, shows, events, or rides in the park. As a result, when a guest with a location sensitive button 100 enters the coverage area 410 of a transmitter 400, the receiver-decoder 200 of the button detects and decodes the signal, and the LEDs 112 are illuminated in the animation sequence identified in the coded signal of the transmitter 400. Further, if desired, multiple transmitters 400 can be arranged within an attraction or theater providing for overlapping coverage areas 410. This arrangement permits use of smaller, lower power, transmitters to cover large areas of the theater or venue.

Figure 4B:
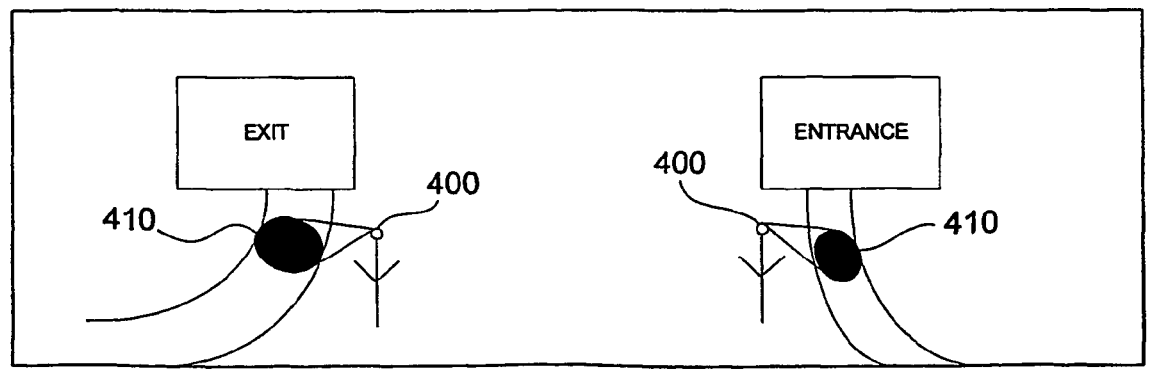

As a further example, referring to FIG. 4B, transmitters 400 can be mounted at entrance and exit points of an attraction. This can be used to determine when a guest enters the attraction so that the animation sequence can be displayed at a certain time while enjoying the attraction. Similarly, if the animation sequence should be triggered when the guest exits the attraction, a transmitter 400 can be mounted at the exit point such that its coverage area 410 covers the exit path.

The transmitters 400 can be fixed or mounted to an attraction or in a particular location in the park. Alternatively, a transmitter can be a mobile transmitter such that it can be carried throughout a crowd or audience. The coded signals from the transmitters 400 can also include time duration and time delay information for the visual displays. By sending time duration information in the coded signal, the visual display will be active for a specific time after the button passes through the coverage area 410. By sending time delay information in the coded signal, the visual display will begin after the prescribed time has elapsed after the button passes through the coverage area 410.

Mounted Transmitter

Figure 5A:
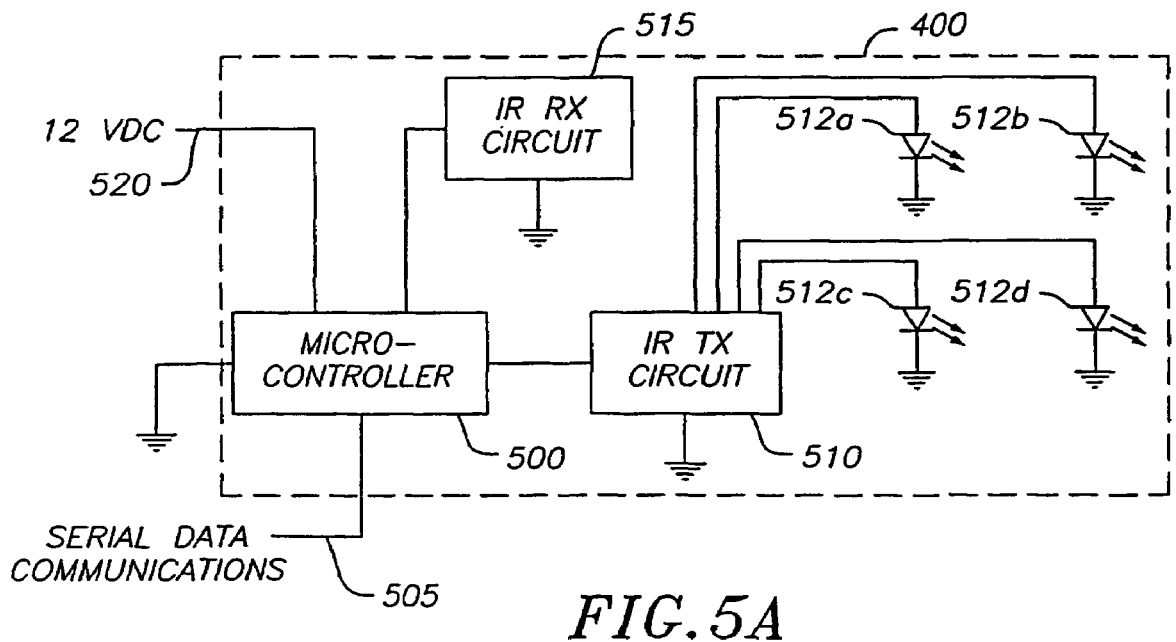
FIGS. 5A-B illustrate general circuit components of fixed and mobile transmitters.

Referring to FIG. 5A, a transmitter 400 mounted or fixed in the entertainment environment includes a transmitter controller, e.g., micro-controller 500 and a transmission circuit 510. The controller 500 and transmission circuit 510 can be powered by a 12 Volt Direct Current (DC) power input 520. The controller 500 also can optionally accept external control signals through the serial data input line 505.

When the transmitter 400 is mounted in position, the controller 500 is normally programmed to provide a signal at periodic intervals to the transmission circuit 510. Connected to the transmission circuit 510 are one or more IR LEDs 512. The transmission circuit 510 provides the appropriate, current-limited, electrical signals to the IR LEDs 512 producing the desired IR signal out into the coverage area 410.

Alternatively, serial data signals from an external control system or computer can provide data through the serial data input line 505 to the controller. The signals from the serial data input line 505 are converted to appropriate electrical signals and sent to the transmission circuit 510 where they are converted to the corresponding IR signal. The serial data input line 505 is also used to perform periodic maintenance functions and also reprogram the controller 500 as necessary.

The mounted transmitter also includes an IR receiver/decoder circuit 515. The IR receiver/decoder circuit 515 is used to wirelessly communicate with the controller 500 to perform certain maintenance and monitoring functions. The IR receiver/decoder circuit 515 is also used to control the timing of IR signals between multiple transmitters with overlapping coverage areas 410, e.g., overlapping coverage areas of transmitters in a show as illustrated in FIG. 4A.

Figure 4C:
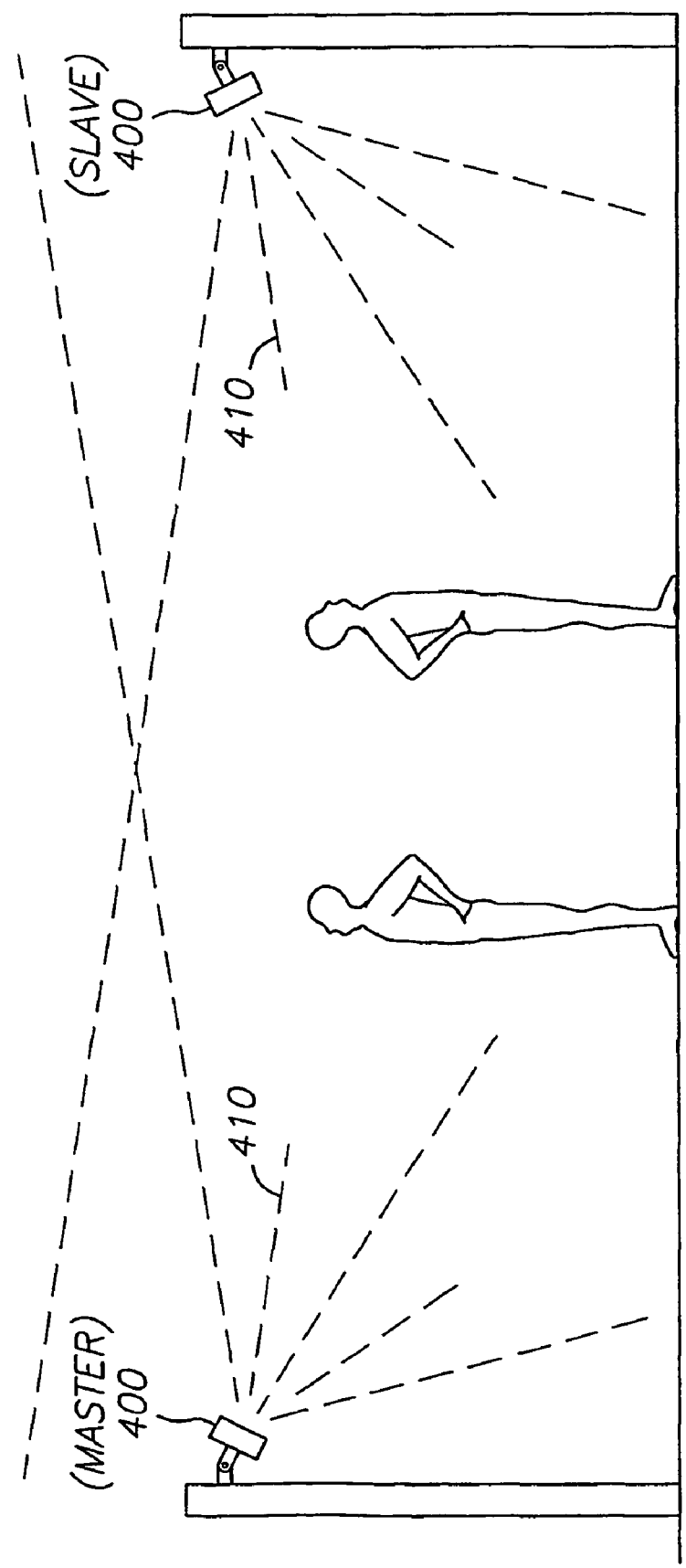

When the coverage areas 410 overlap, as illustrated in FIGS. 4A and 4C, the coverage areas of the transmitters are in view of each other, e.g., on opposite sides of a street. The mounted transmitters 400 can be configured in a master/slave arrangement whereby the master transmitter 400 produces an IR signal at regular periodic intervals (e.g., every ½ second) into the coverage area 410. The other transmitter, the slave transmitter can be configured so that when the IR receiver/decoder circuit 515 on the slave transmitter detects the IR signal from the master transmitter, the signal emitted by the slave transmitter will be delayed for a programmed delay time (e.g., 100 ms), and transmitted. This arrangement is beneficial when attempting to provide complete coverage over a passageway or street. The two transmitters alternately send IR signals into the area between them providing reliable complete coverage without the possibility of the signals overlapping in time.

Mobile Transmitter

Figure 5B:
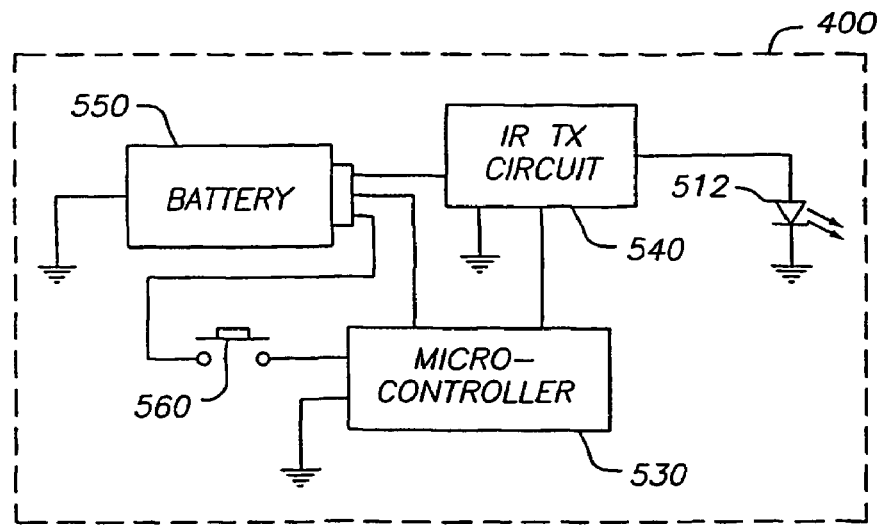

Referring now to FIG. 5B, transmitters 400 can be mobile such that they can be attached to or carried by an entertainer who moves throughout the park to locally trigger animation sequences by physically approaching guests. Mobile transmitters 400 include a controller, e.g., micro-controller 530, transmission circuit 540, battery 550 and a switch 560. The battery 550 provides power to the switch 560, controller 530, and transmission circuit 540. When the entertainer presses the switch 560, the controller 530 provides the program code to the transmission circuit 540. Connected to the transmission circuit 540 is an IR LED 512. The transmission circuit 540 provides the appropriate, current-limited, electrical signal to the IR LEDs 512 producing the desired IR signal out into the coverage area 410.

Using mobile transmitters provides flexibility to trigger additional animation sequences in the event that the coverage area of a fixed IR transmitter does not reach a guest. Further, mobile transmitters eliminate the need to install additional fixed transmitters. The use of mobile transmitters also permits direct interaction and game play between the entertainers and members of the audience wearing the display devices 100.

Those skilled in the art will recognize, however, that other communications systems and protocols can be used besides IR communications using IR transmitters and receivers. For example, low power RF transmission, inaudible and audible audio signals, GPS receivers, and low power wireless networking protocols (e.g. Blue Tooth and 802.11b) can also be utilized. However, for simplicity, this specification refers to IR communications, protocols and components.

In addition, with reference to FIGS. 6A-C, kiosks or information centers 600 can be installed throughout the park. The kiosks 600 include a touch-sensitive screen 615 and other input devices for the guest to learn more about the park's history and related information. The kiosks 600 portrayed in FIGS. 6A-C are identified with a marquee 610 which is designed like a button 100. For example, the kiosk 600 in FIG. 6A includes a marquee 610 which is designed like the button 100 in FIG. 1A. Similarly, the kiosk 600 in FIG. 6B is identified by a marquee 610 designed like the button 100 in FIG. 1B. The marquee 610 can include lights 612a-d which can be illuminated with the sequences are illuminated on the buttons 100. The components of the kiosks 600 are illustrated in further detail in FIGS. 7A-C.

Figure 7A:
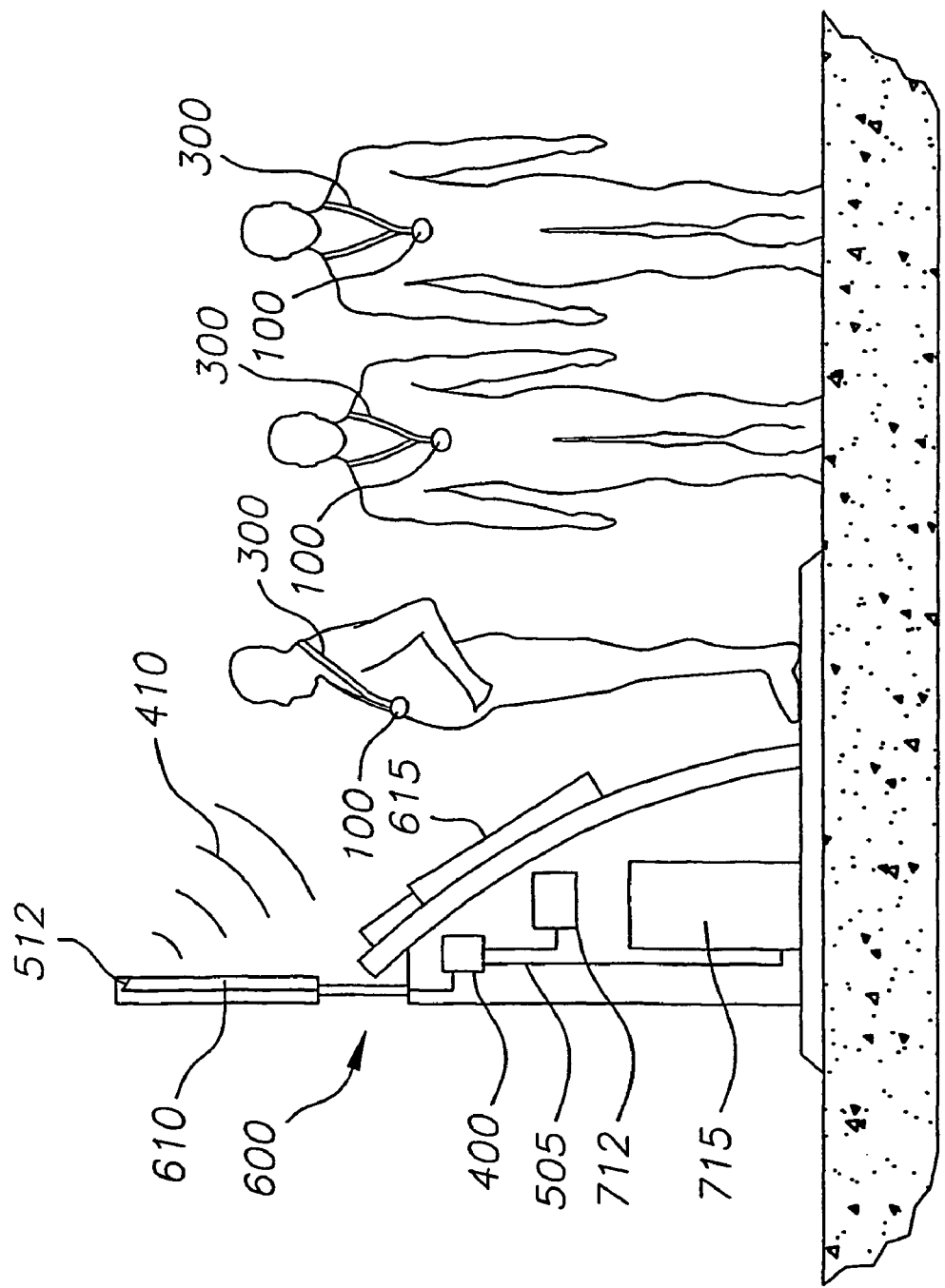

Referring to FIG. 7A, guests with a location sensitive button 100 secured by a necklace or lanyard 300 will approach a kiosk 600. Contained in the base of the kiosk 600 is a kiosk control computer 715. The kiosk control computer 715 accepts various input signals from the touch-sensitive display screen 615 and other user inputs. The kiosk control computer 715 also controls the information presented on the display screen 615.

Also mounted in the base of the kiosk is a modified version of the mounted transmitter 400. The transmitter 400 can be powered by a transmitter power supply 520 (FIG. 5) or by the kiosk power supply 712. This mounted transmitter is modified by remotely mounting one or more infrared LEDs 512 in the marquee sign 610 mounted at the top of the kiosk. The kiosk control computer 715 generates IR coded signals by sending serial data to the transmitter 400 through the serial data input line 505. The transmitter 400 sends electrical signals to the infrared LEDs 512 which emit an IR signal down into its coverage area 410 in front of the kiosk 600.

While the guest is interacting with the kiosk 600, the IR signals are detected and decoded by the receiver-decoder 200. The receiver-decoder outputs a control signal which triggers a program in the control circuit 210 to be executed, causing an animation sequence to be displayed on the location sensitive button 100. The IR signals can be generated at random intervals or as a direct response to an input to the touch-sensitive kiosk display 615. For example, if the user answers a question correctly or advances in a game of skill or knowledge, an IR signal can be generated to activate the device 100 producing a display as a visual reward.

Further, with reference to FIG. 7B, the kiosk control computer 715 can control the marquee lights 612 in synchronization with the IR signals so the visual display on the marquee 610 and the display device 100 match in color and timing.

Figure 7C:
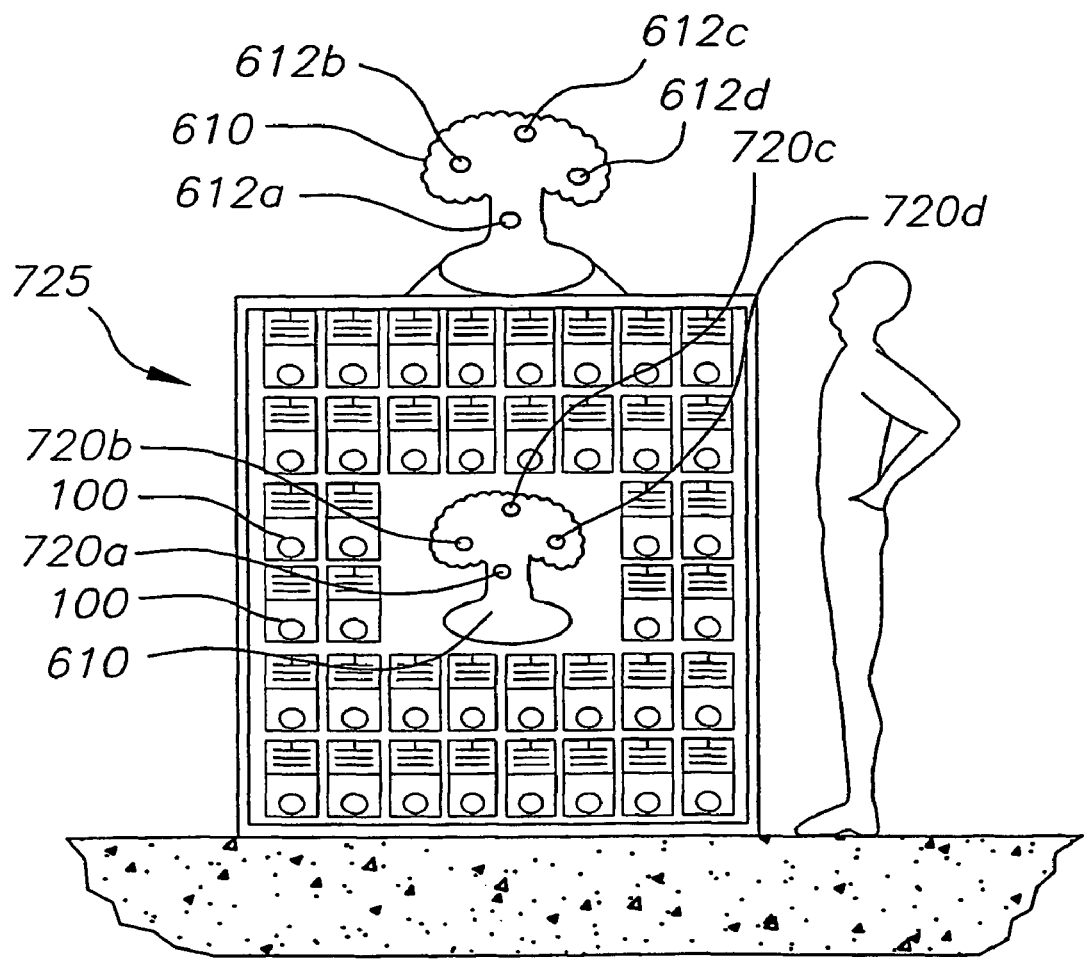

Additionally, with reference to FIG. 7C, one or more of the marquees 610 can be incorporated into a merchandise display or rack containing an array 725 of the display devices 100. In this application, the marquees 610 demonstrate the various functions of the display device to potential buyers. Proximity switches or buttons 720*a-d* can be incorporated into the marquee allowing potential buyers to initiate the visual displays without the presence of an IR signal.

Applications of Location Sensitive Display Device

The button 100 and system generally described above can be utilized in many applications to enhance guest experiences and entertainment within the theme park. In addition, the buttons provide new merchandising and marketing methods.

Enhancing Guest Entertainment

There are a number of ways that the subject device provides a new and exciting display device, system, and method to display animation sequences to individual guests or groups of guests, to enhance the experience in the park. Example applications of the button and system include, but are not limited to:

1. Triggering an animation sequence when a button detects a transmitter corresponding to a particular park location;
2. Coordinating animation sequence of the LEDs on the button with a central control system;
3. Providing a mass audience effect or having multiple guests receive the same animation sequence at the same time;
4. Timing animation sequences to coordinate with a show, event, or display, for example, synchronizing the outputs of the button with a parade or fireworks display;
5. Triggering animation sequences with theme park props or costumed characters;
6. Entertaining and informing guests at information booths or kiosks with animated sequences;
7. Providing the guest an ability to control an animation sequence;
8. Providing for a theme park game in which the object is to visit certain locations within the park or to find a special location or transmitter;
9. Providing for team games with animated sequences or LEDs;
10. Providing for a treasure hunt or reward game;
11. Enabling special interactions between entertainers or performers and guests;
12. Enabling button (guest to guest) communications;
13. Providing for park or attraction games of skill or trivia questions; and
14. Providing for the accumulation and storing of the scores obtained from the games of skill or trivia and comparison of scores obtained from multiple devices.

Each of these enhancements to the guest's entertainment is described in further detail.

Triggering Sequence When Guest Visits Particular Location

The output of the button 100 can be used to indicate which locations, rides, shows, or attractions the guest has visited.

Transmitters 400 are typically mounted in a somewhat permanent installation, such as within or near one or more attractions, and emit coded signals related to the particular park location. As a result, a button which receives the coded signal can provide an animation sequence corresponding to that attraction.

More specifically, transmitters can be configured and programmed to continuously broadcast an IR message at specific time intervals (e.g. every ½ second). Guests who wear the button may come into the range or coverage area 410 of the emitted IR signals. This may result from, for example, riding or walking through an attraction or entrance or exit, as illustrated in FIGS. 4A-B. When a guest enters an IR coverage area 410, a receiver-decoder 200 (e.g., an IR receiver or IR photodiode) detects and decodes the message into a control signal which is provided to the control circuit 210. The control circuit generates outputs which drive the LED indication units 112 of the display base 110 of the display device 100.

If the guest remains in the coverage area 410 when the first animation sequence is completed, then the animation sequence can be repeated for as long as the guest remains in the coverage area 410.

An extension of this activity is using the button to track how many designated attractions the guest has visited as part of a game. For example, a LED can be illuminated when the guest visits a designated location, and if the guest visits all of the designated locations, then a special animation sequence can be played to indicate that accomplishment.

Figure 8:
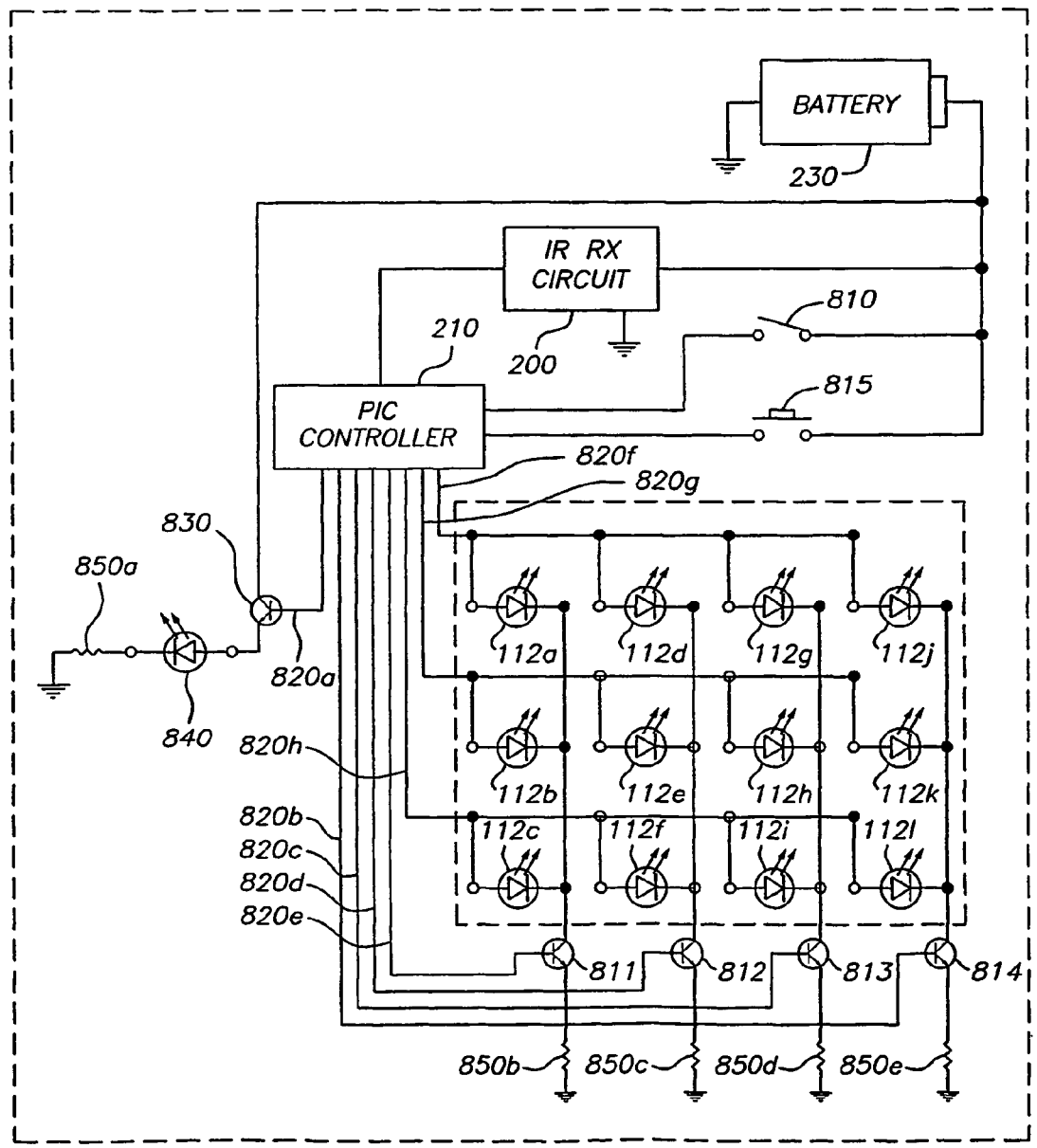
FIG. 8 is an example electrical schematic diagram of an IR receiving circuit with 12 LEDs and a "Show" or special LED.

For example, FIG. 8 illustrates an example button having 12 LEDs (112*a-l*), an IR receiver-decoder circuit 200, a control circuit 210 such as a micro-controller, and a battery 230. The battery 230 powers the receiver-decoder circuit 200, the output of which is coupled to the control circuit 210. Power is provided to the control circuit 210 through a switch 810.

The IR receiver-decoder decodes signals detected from a transmitter and provides the control signal to the control circuit 210. The momentary contact push-button 815 coupled between the battery 230 and the control circuit 210 provides the guest the ability to control the activation of the LEDs.

The control circuit 210 has eight outputs (820*a-f*). One output, 820*a* is provided to the base of transistor 830. One of four outputs (820*b-e*) is provided to the base of respective transistors 811-814. Three outputs (820*f-h*) are provided to the anodes of respective LEDs 112*a-l*. Specifically, output 820*f* is provided to the anodes of LEDs 112*a,d,g,j*; output 820*g* is provided to the anodes of LEDs 112*b,e,h,k*; and output 820*h* is provided to the anodes of LEDs 112*c,f,i,l*.

Resistors 850*a-e* are provided to limit the current flowing through each LED. In addition, the collector of transistor 830 is coupled to the battery 230, and the emitter is coupled to the anode of "show light" LED 840 with the current limited by the resistor 850*a*.

This matrix arrangement of control signals is commonly known in the electronics industry enabling more elements (e.g. LEDs) to be controlled by using fewer control signals. In this example, 7 outputs from the controller 210 are used to individually control 12 LEDs. Other arrangements of control signals and LEDs are possible providing equivalent functions and are well known in the electronics industry.

With this configuration, LEDs 112 are activated by selectively providing high signals from the control circuit 210 to activate certain LEDs 112 and transistors 811-814. For example, if a guest visits a first location, then LED 112*a* can be activated by the control circuit providing a high signal to output lines 820*f* (into the anode of LED 112*a*) and 820*e* (into base of transistor 811). As a result, LED 112*a* is illuminated and transistor 811 is turned on, resulting in current through LED 112*a*, transistor 811, and resistor 850*b* to ground. Similarly, if the guest visits a second location, output lines 820*g* and 820*e* are activated, thereby turning on LED 112*b*. As a result, current flows through transistor 811 to ground, and so on for various activation of LEDs and transistors.

The show light 840 can be illuminated when all 12 LEDs are activated. In this case, the control circuit 210 can provide a high signal to output 820*a*, which turns on transistor 830. As a result, a high signal is provided to the anode of show LED 840 since the battery 230 voltage (minus a voltage drop across transistor 830) is provided to the anode of show LED 840 to illuminate it. The resistor 850*a* limits the current flowing through the show LED 840.

Thus, as the guest proceeds through the park and visits all 12 designated locations, all of the LEDs can eventually be illuminated, in which case, a special animation sequence (e.g., show light 840 or other sequence) can be played indicating the accomplishment. The guest may then be eligible for special gifts, park privileges, prizes.

However, even if the guest does not illuminate all of the LEDs 112 by visiting all of the locations, the button can be used for other applications as described below.

Animation Sequences According to External Control System

Figure 9:
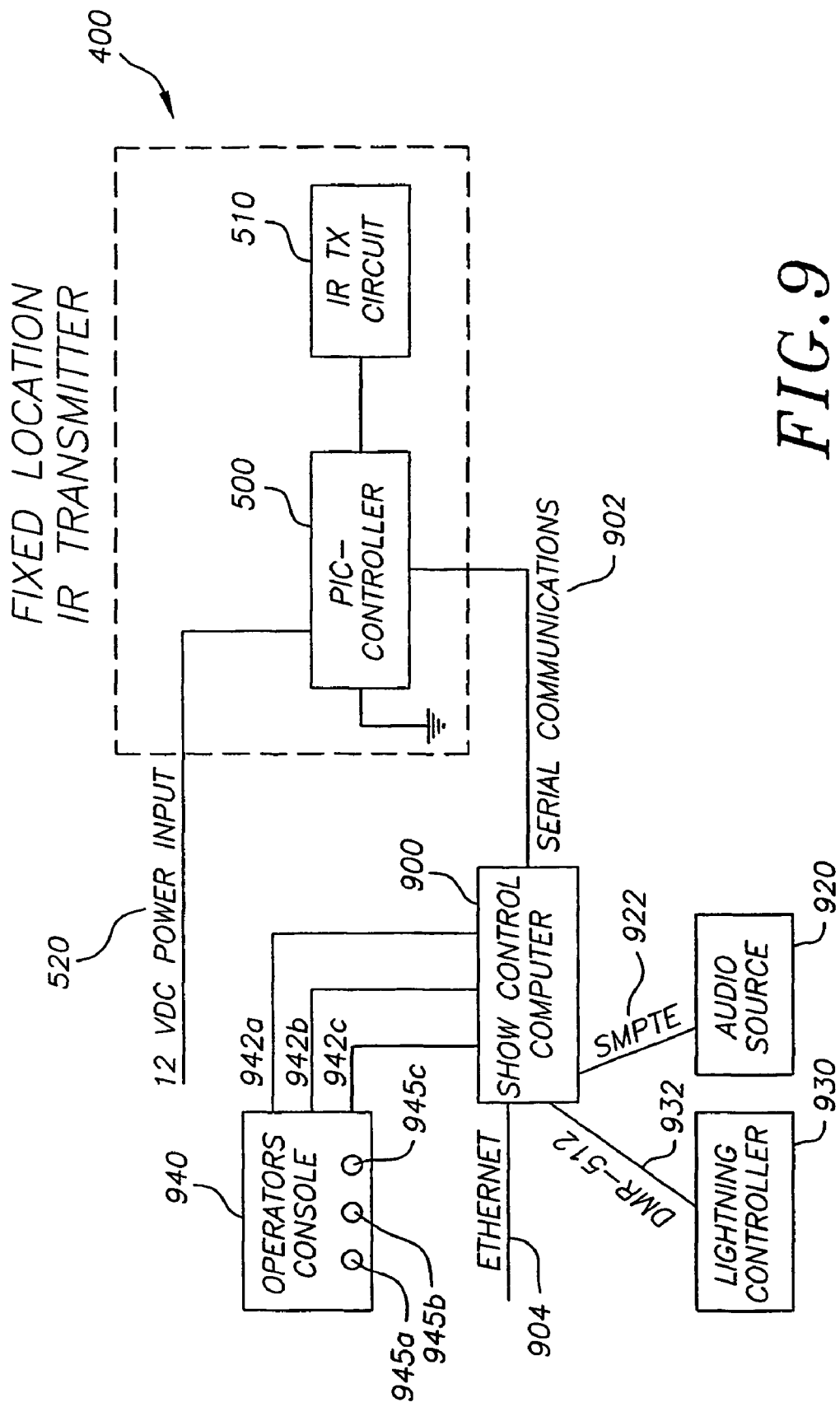
FIG. 9 is a schematic diagram of a central control system and interface with an IR transmitter.

With reference to FIG. 9, animation sequences can also be coordinated by a central control system. Thus, instead of having the IR transmission circuit 510 in the transmitter 400 emit the same IR coded signal, the controller 500 can be programmed and reprogrammed to emit different coded signals corresponding to different animation sequences and/or to coordinate with effects under control of a central control system. This further enhances the entertainment effect of other shows and attractions. This control system can be applied to both fixed and mobile transmitters 400.

Control of Fixed Transmitter

Specifically, in FIG. 9, a controller 500 of a fixed transmitter 400 can interface with a central show control computer 900 using serial data communications 902. The control computer 900 can also receive input through an ethernet connection 904. The central control computer 900 can be a conventional commercially available desktop or laptop computer. The central control computer 900 can also be configured from modular industrial computer components commercially known as PC/104 form factor devices. The central control computer 900 can also be linked via conventional ethernet networking components to a larger network and the internet.

The control computer 900 communicates control signals indicating the identity and timing of an animation sequence through the serial communications link 902 to the controller 500. The controller 500 receives the serial data 902, converts the data into an IR signal and provides it to the IR transmission circuit 510. The IR transmission circuit 510 emits an IR coded signal corresponding to the animation sequence and timing of the same. Then, when guests with buttons 100 within the coverage area 410 of the transmitter 400 receive the IR code, the receiver-decoder 200 detects and decodes the signal. A control signal is then provided by the receiver-decoder 200 to the control circuit 210, and a corresponding program is executed. As a result, the animation sequence displayed on the LED indication units 112 is coordinated with other effects under the direction of the central computer 900.

When that animation sequence has completed, the central control computer 900 can issue another serial message calling for a different animation sequence, and so on, to reprogram the controller 500 as necessary to coordinate animation sequences with effects managed by the central control system.

For example, the animation sequences displayed on the button 100 can be synchronized with an audio source 920 which is also managed by the central computer 900. The audio source 920 may be configured to communicate with the central computer through a SMPTE link 922 for Society for Motion Picture and Television Engineers (SMPTE) communications protocol. This protocol provides standards and time codes for hours, minutes, seconds, and frames on audio or videotape for synchronization purposes. This SMPTE link is also used to synchronize animation sequences at particular times during the day.

Alternately, the show control computer may be synchronized with a lighting console 930 through DMX-512 control signals 932 originating from a lighting console 930 or other lighting playback device. Thus the LEDs on the display device can be synchronized directly with other lighting elements (e.g. strobe lights, spot lights) in the entertainment environment.

An operators console 940 may also be provided with multiple manual pushbuttons 945*a-c*. This console 940 is typically located in the control booth for a theatrical show providing the stage manager with the ability to manually initiate animation sequences on the display devices through digital signals 942*a-c* provided to the central show control computer 900. When the stage manager pushes one of the buttons 945, the corresponding digital signal 942 from the pushbutton is sensed by the show control computer 900 using conventional digital input/output control hardware. The show control computer 900 is programmed to respond to these digital input signals by sending out corresponding serial data 902 to the fixed transmitter.

Control of Mobile Transmitter

The central control system can also program and reprogram mobile transmitters 400. With a mobile transmitter, the show control computer 900, is temporarily connected to the mobile transmitter and sends it serial data 912. This serial data can include the current time, the time remaining before the animation sequences are to begin, and the codes for the desired animation sequences. This information is stored in the memory of the controller 500. Then, the mobile transmitter is disconnected from the computer 900 and carried by a performer or stage technician. At the appropriate time, the controller 500 sends the correct electrical signals to the IR transmission circuit which emits the IR signal into the crowd or audience. Thus, the flexibility of mobile transmitters is further enhanced with the ability to program them with different animation sequences and timing instructions.

Mass Audience Event Using Central Control System

Multiple buttons 100 can also be synchronized for an enhanced event involving a group of people or audience without having to install transmitters 400 throughout the crowd. There are two techniques for synchronizing multiple buttons 100, both of which use a delay technique or Delayed Event code. With the delay feature, the transmitted codes specify which animation sequence should be displayed and how long the sequence will be delayed before it is displayed. This is particularly useful when people receive the transmitted code as they pass through the coverage area 410, and the animation sequence is played at a later time, thereby involving more guests.

In one delay technique, IR transmitters 400 are placed in locations such that the coverage area includes the areas where the audience passes by before a show begins, e.g., at a ticket booth, crowd control turnstiles, or entrance. The mass audience effect can be accomplished using the central control system of FIG. 9. The IR transmitters 400 are connected to the control computer 900 via a serial data link 912. The control system knows the time interval between the current time or when a guest passes by the transmitter 400, and the time the animation sequence is to begin on the button 100. The central control system formulates the appropriate serial message which is transmitted to the IR transmitter 400 via the serial data link 912. The IR transmitter 400 receives the serial message, converts it into an IR message, and broadcasts the IR message to the buttons 100 within its range. The buttons 100 receive the IR message and decode it to determine the appropriate time delay before the mass audience effect is initiated.

An internal countdown timer set at the time delay is implemented with software in the control circuit 210 in the button 100. Meanwhile, the guest wearing the button 100 continues into the show area and takes his or her seat. Eventually, the countdown timer will expire after the specified time delay, and the animation sequence begins.

Transmitters 400 can also be positioned in areas where all of the guests exit the park, as illustrated in FIG. 4B. As a guest passes by, an IR transmitter 400 sends a signal to the button 100. The signal is configured to initiate an animation sequence after a specified delay. The time delay is programmed to coincide with an audio message broadcast over the public address audio system. As a result, the guest hears the audio message thanking them for attending the attraction while the animation sequence is displayed.

Figure 10:
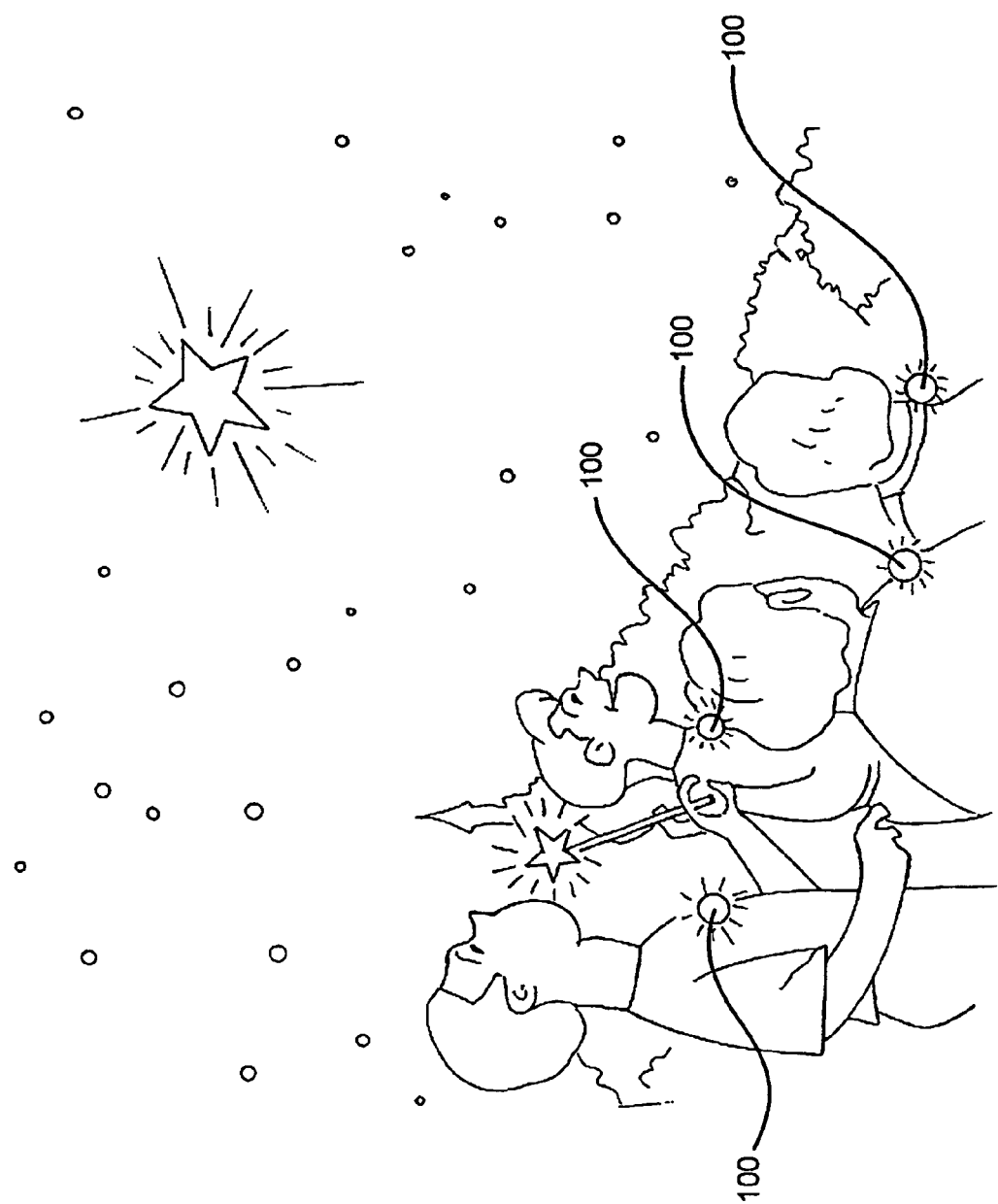
FIG. 10 illustrates an example mass audience effect carried out using the location sensitive button.

With this first technique, animation sequences are coordinated so when guests wearing the buttons 100 pass a transmitter 400, the animation for all of the guests will begin at the same time. This is useful when a group animation sequence is desired, e.g., in a finale display or to provide a "magical goodnight" message for the guests as they leave the park, as illustrated in FIG. 10.

A second technique uses a system of mobile transmitters 400. Costumed characters can move throughout a crowd and locally transmit signals to a select, smaller audience. Similar to the first technique, transmitters are in communication with the central attraction control system. The control system and transmitters are synchronized to a common time base, and the attraction control system specifies the time between the current time and the desired event time. The IR transmitters record this time duration and initialize an internal countdown timer.

The mobile transmitters are disconnected from the central attraction control system and moved throughout the crowd to ensure that as many guests as possible receive the coded message containing the specified delay. Meanwhile, the mobile IR transmitter computes the current delay time by subtracting the time that has elapsed from when the message was received by the button from the original delay time. When the elapsed time reaches the specified delay time, all of the animation sequences will simultaneously begin, thus enhancing the attraction experience.

Synchronizing and Timing Animation Sequences to Coordinate With Show or Display

Animation sequences displayed on the location sensitive buttons 100 can be synchronized with different timing effects to enhance the enjoyment of the show.

Figure 11A:
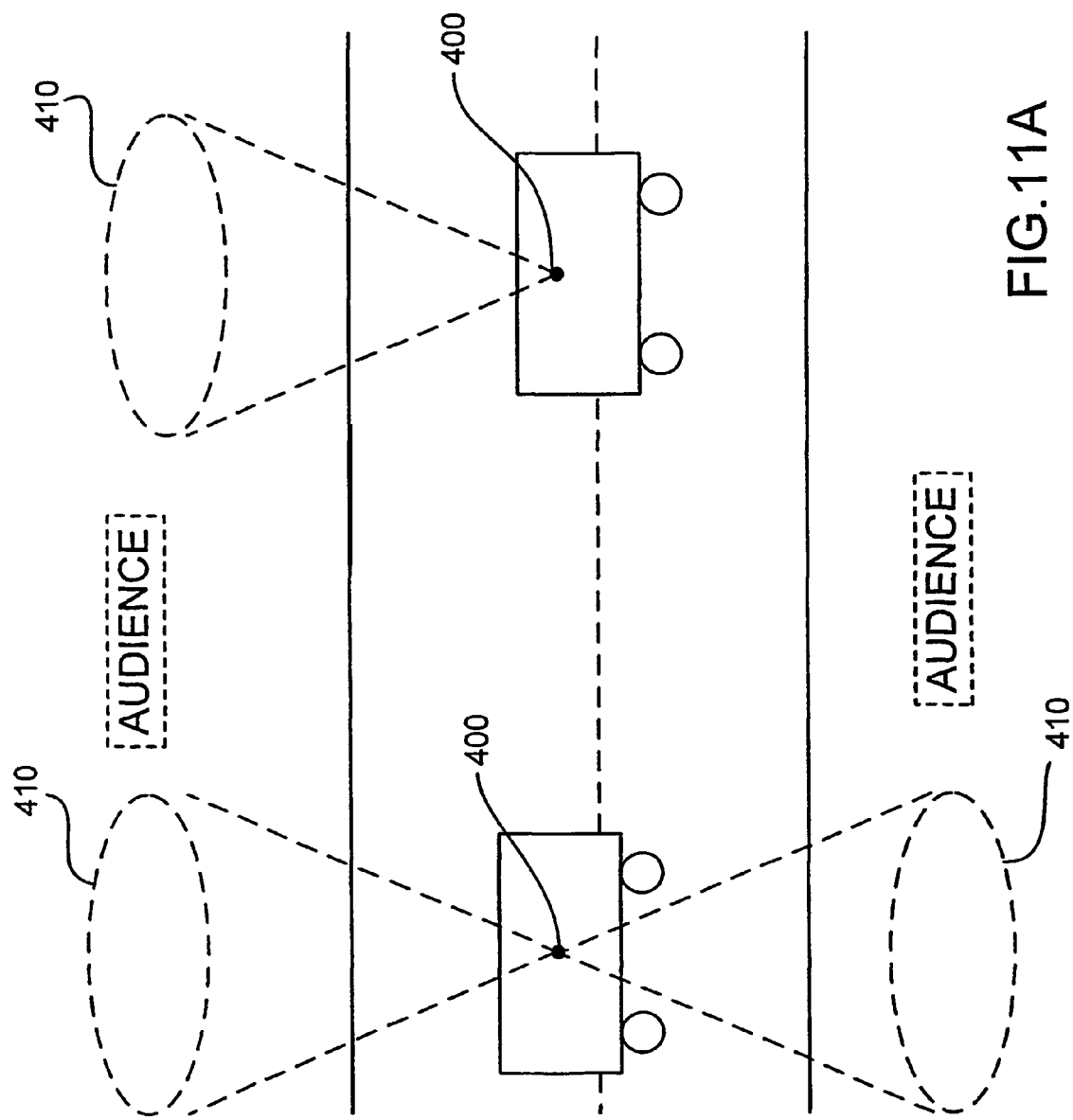
FIGS. 11A-B illustrate the location sensitive button being used to provide an animation sequence in connection with a parade.
Figure 11B:
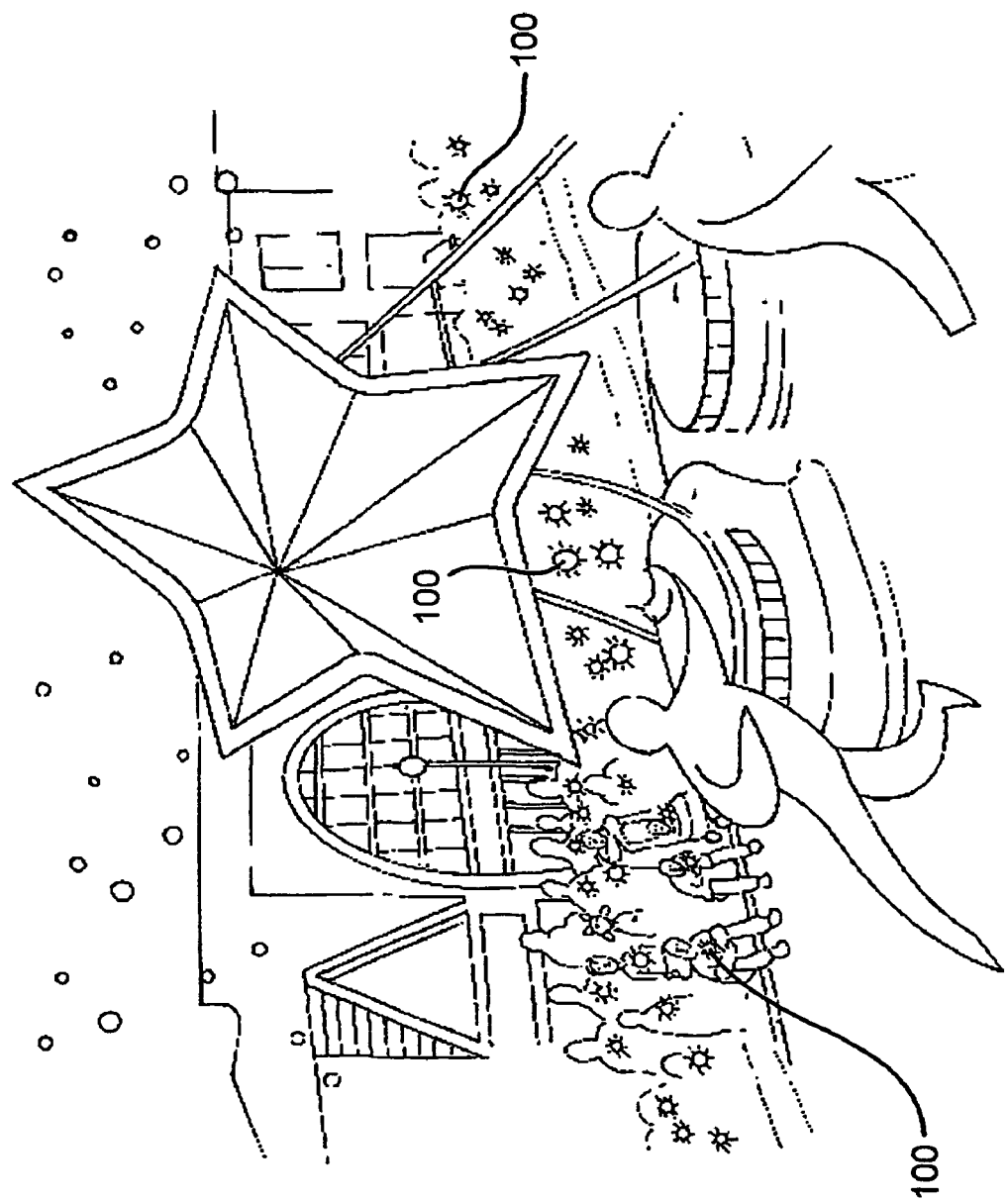

For example, the buttons are useful for providing animation sequences which are displayed during events or displays, e.g., a nighttime parade or fireworks show, as illustrated in FIGS. 11A-B.

In a parade, IR transmitters 400 are mounted to parade floats or vehicles and can be powered by the float's electrical system. Alternatively, the transmitters can be carried by parade performers as either hand-held devices or integrated into their costumes as battery powered devices.

As the float progresses down the street, a transmitter 400 broadcasts IR messages to one or both sides of the crowd within its coverage area 410. The transmitters can broadcast continuously, repeating the same message at specific time intervals. Alternatively, they can be connected to a central control system onboard the parade floats in which case they can be reprogrammed as necessary to be synchronized with lights and audio onboard the float using the system of FIG. 9. When the parade float passes a guest, the IR signals trigger LED indication units 112 to flash in synchronization with the parade float. Hand-held transmitters 400 carried by the parade performers can be used to provide localized IR messages to selected members in the crowd to provide localized effects.

Similarly, the button 100 can be programmed to flash in synchronization with certain fireworks displays. These effects are often triggered at precise times in the show. The LEDs 112 of the buttons 100 can be triggered to turn on and then fade out with the pyrotechnic effect.

Thus, the buttons can be used to coordinate and synchronize the animation sequences with a show, event, or display, the animation sequences may be displayed immediately, for a particular duration, or be delayed for a specified time.

When the receiver-decoder 200 receives an IR message from a transmitter 400 calling for an immediate animation sequence, that animation sequence is started immediately and run to completion. At the end of the animation sequence, the receiver-decoder is ready to accept a new IR code.

The IR transmitter 400 can also specify the total duration of the animation sequences. This is known as a Timed Event Code. In this case, the animated sequence will be repeated or looped until the elapsed time is equal to or greater than the specified total time duration. Thus, if the total time duration specified in the IR signal is 25 seconds, and the individual sequence only lasts for 200 ms, then the sequence will be repeated 125 consecutive times for a total show time of 25 seconds. Following this extended show, the receiver-decoder is then ready to accept a new signal from any IR transmitter.

A code can also be emitted by a transmitter 400 indicating how long an animation sequence should be delayed. This is known as a Delayed Event Code. Thus, no LEDs 112 are illuminated right away. Rather, the control circuit 120 initiates a timer-counter and at the prescribed time, the selected animation sequence will be initiated after the delay period. The delayed show sequence may also have a specified duration similar to the Timed Event Code.

Triggering Animation Sequences With Park Props or Characters

Yet another application of the button is initiating animation sequences when interacting with theme park props or characters. In this effect, small battery powered IR transmitters are incorporated into costumes or props of costumed characters. When a performer inside the costume recognizes a guest wearing a button, the performer can activate the transmitter 400 by pressing a hidden button or switch 560, as provided in FIG. 5B. The transmitter then sends an IR message, which is received and decoded by the receiver-decoder 200 of the button 100 resulting in an animation sequence. This enhances the level of interaction with the theme park character and produces a special and memorable moment for the guest.

Information Kiosk

A further application of the button 100 is in connection with computer kiosks 600 or information booths, as illustrated in FIGS. 6A-C and 7A-C. Kiosks 600 are typically incorporated into merchandise and special event areas to entertain and inform guests. An IR transmitter 400 incorporated into the kiosk 600 emits a coded signal received and decoded by the button 100, triggering an animation sequence.

Proximity Switch-Guest Control

The button 100 can also include a switch, e.g., a proximity switch, to enable the guest to control animation sequences.

The proximity switch detects the presence of a finger or other object touching or approaching a defined area on the face of the button. One example proximity switch is a capacitive sensing proximity switch.

When the circuitry and the software detects a person touching the defined area, a special animation sequence can be played. As a result, the user can control, play, and observe the animation sequence without having to be within the presence of an IR transmitter 400 or even within the park. The software in the control circuit 210 can be designed to play the same animation sequence each time the proximity switch is activated, or cycle through all of the available animation sequences stored within the control circuit 210.

Game Event-Search for Special Transmitter

In this application, one of the transmitters 400 in the park is identified as a "special" transmitter. This special transmitter has a special cosmetic exterior and graphics identifying it as such. The location of the special transmitter can be changed daily such that the guests can be engaged in game to locate it.

The special transmitter is programmed to broadcast a special IR code. When a guest finds the special transmitter, the receiver-decoder 200 decodes the signal into a special animation sequence which is displayed by the LED indication units 112.

The special animation can continue uninterrupted for an extended duration (e.g. 15 minutes). During this time, the guest can be entitled to certain privileges (e.g. reserved seating for shows) or limited edition gifts (e.g. trading buttons, posters, etc.). If the guest presents his or her button 100 to the proper person or location during the special animation sequence, the guest can receive the gift or privileges.

Team Game

The button 100 can also be used as part of a team or group game. For example, a crowd of people can be separated into four teams, each identified with a color that matches one of the colors of the LEDs of the button.

The four teams compete in a game against each other. For example, if one team answers a question correctly or advances in the game, IR transmitters in their vicinity send a coded IR signal to trigger the buttons of that group to illuminate LEDs with a matching color. The color of the area or stage lighting can also be changed using conventional theatrical stage lighting techniques to match the color of the LEDs on the buttons. Further, when one team completes and wins the game, animation sequences on all of the buttons in the team can be activated to display the color of the winning team.

Treasure Hunt/Reward Game

A further example of how the button 100 can be utilized is in the context of a treasure hunt. However, in addition to, or instead of searching for particular items, the game can be based on attending certain shows, eating in restaurants, meeting certain characters, making purchases in merchandise shops, etc. For each specified event or item, the guest's button animates to indicate the accomplishment. During the day, the guest may attend other events or shows, and the button animates with the corresponding display or sequence.

Depending on the number of items in the treasure hunt list, the button 100 may include a larger number of LEDs 112. Thus, for example, one LED assembly can be structured as a clock face with 12 LEDs, one at each "clock" position. If the guest visits a particular show, a LED in the one o'clock position is illuminated. If the guest then visits a particular restaurant, a LED in the two o'clock position is illuminated, and so on. Once the guests achieves a certain level of accomplishment, e.g., completing all 12 defined tasks, a special animation is initiated. During the special animation, the guest can be eligible for an award, e.g., preferred seating at a show, merchandise discounts, reduced wait-times for attractions, etc.

Ceremony Interactions

The lighting of a button 100 can be included as part of a ceremony. For example, a guest making a qualifying purchase or completing a certain task can be "Knighted" (or "Lighted") where the triggering device is built into a sword, wand or other prop. Further, if the guest has his or her picture taken, a camera and flash can trigger a LED on the button.

Button to Button Communications

Personal data (e.g., preferences, favorite character, movie, hometown, etc.) can be programmed into buttons 100 when they are purchased. Then, when a programmed button is in the vicinity of other buttons with the same preferences, they can flash and animate to indicate the same. This provides additional opportunities for interactions between guests with similar interests. However, this would utilize additional programming infrastructure and additional IR transmitting circuitry within each button 100 to enable IR communications between each other.

Attraction or Park Game

Figure 12:
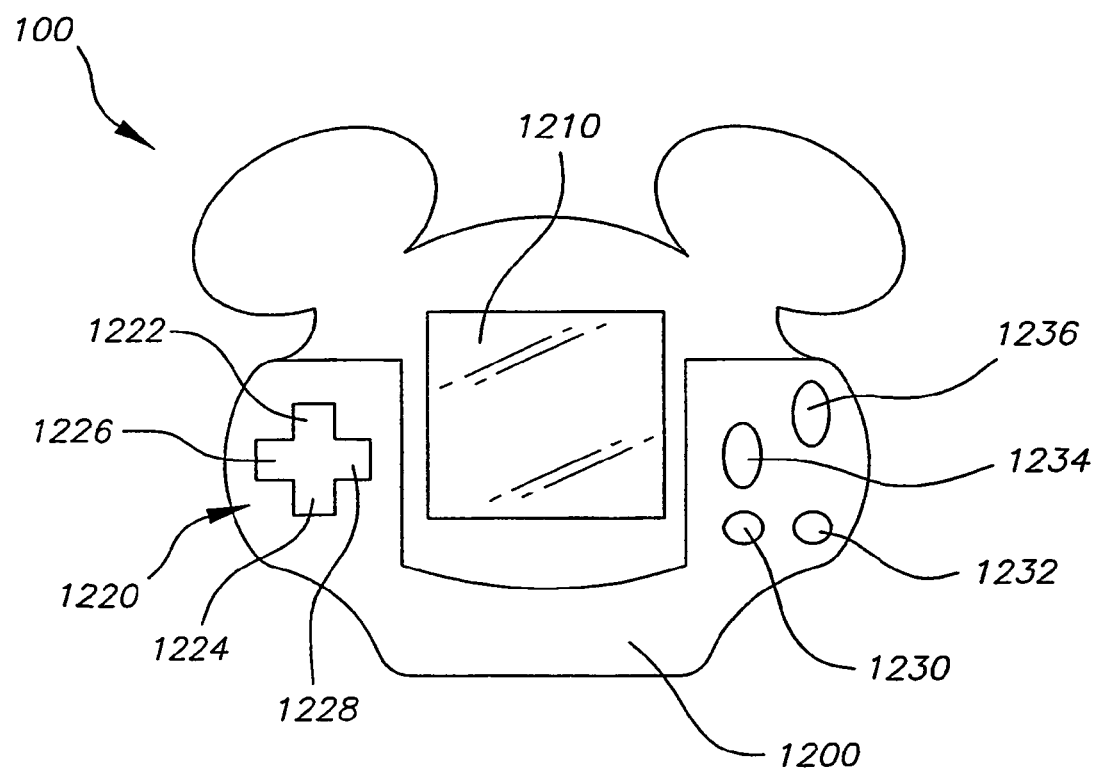
FIG. 12 is an example display device with a LCD screen for playing a game of skill or knowledge.

With reference to FIG. 12, in an alternative embodiment, the display device can be configured for use in connection with a game related to the park which is triggered based on the location of a guest in the park.

In this embodiment, the display device is a hand held display module 1200 which includes a receiver-decoder 200 and a control circuit 210, similar to the embodiment directed to a button or pin. In addition, the game display device 1200 can have a display base with a Liquid Crystal Display (LCD) screen indication unit 1210 which is illuminated when activated, and other electronic components to facilitate viewing or playing a game. Further, the display device can include a speaker (not shown) if the game has sounds which can be heard by the guest. The display module 1200 can be designed to resemble an aspect or character of the park.

In this embodiment, as a guest visits different shows or attractions in the park, IR codes from a transmitter 400 are decoded by the receiver-decoder 200 which provides a control signal to the control circuit 210 such as a micro-controller. Stored within the program memory of the control circuit 210 are programs representing different games, e.g., word games, maze games, role playing games, skill games, knowledge games such as a trivia game, and strategy game. The number, type, and complexity of the games depend on the capabilities and available memory or storage capabilities of the control circuit 210.

When coded signals emitted by the transmitters 400 are detected and decoded by the receiver-recorder 200, the game is activated for the guest to play through input buttons or control pads and the LCD screen. As an illustrative example, a trivia game about a particular show or attraction can be provided to the guest when the guest visits that show or attraction. Thus, trivia questions and answers are activated and displayed on the LCD screen for the guest to consider. The questions and answers can be presented to the guest through a speaker (not shown) if the programmed game includes sound features.

The guest views the question with the possible answers displayed on the LCD screen 1210, and then selects his or her answer through directional control pad 1220 with Up 1222, Down 1224, Left 1226, and Right 1228 directions. In addition, the guest can enter his or her controls through buttons A 1230, B 1232, Menu 1234, and a On/Off 1236 button. The control circuit processes these inputs to further indicate on the LCD screen 1210 or through a speaker if the guest's answer is correct.

When initially purchased by or provided to a guest, only a small subset of the games or questions can be activated and available for play. The remainder of the games or questions corresponds to locations or attractions within the park. Each of the games is designed to enhance the knowledge or enjoyment of a particular location within the park. Further, as the guest proceeds to the coverage area of a different IR transmitter 400 corresponding to a different attraction, show, or ride, another game can be triggered by that coded signal and displayed on the display module 1200. This embodiment of the display device is particularly useful to provide game entertainment to guests in locations where they must wait for extended periods of time (e.g. queues at attractions, parade routes, theaters, shows, or restaurant lobbies). The games enhance the guest experience and knowledge of the various locations visited, and also provide memories of their visit. The games are also beneficial since they engage the minds of both children and adults while they are waiting in line. Further, the device can be used by members of a group waiting for others to complete an attraction. For example, young children may not be permitted on certain rides due to height restrictions. While these children are waiting for the older children or adults to experience the attraction, they may play a game related to the attraction, thereby allowing them to experience at least a part of the attraction.

The control circuit 210 can be programmed with the guest's name and address, and as the guest uses the device, their scores can be recorded. At the end of the day, the device 100 can be returned to a computer controlled display where the personalization data and the score data is transferred from the device to the memory of the computer controlled display. This communication between the computer controlled display and the game device is accomplished using conventional IR wireless communication hardware and software.

Once recorded, the personalization data and the scoring information can be used to reward guests for attaining certain scoring levels or the high score of the day. The rewards (e.g. merchandise discounts) can be awarded or mailed to the guest's home address.

Of course, those skilled in the art will recognize that many different types of games related to some attraction or aspect of the park can be programmed into the control circuit and used to entertain guests when they enter specified park locations. Further, the number and locations of the IR transmitters 400 can also be changed to accommodate new games or locations.

Guest Benefits

Upon performing specified activities and activating a certain number or all of the LEDs 112 of the location sensitive button 100, the guest can be eligible to receive certain rewards while inside the park. Example rewards include:
1. Using the button to view or ride an attraction without prior authorization (e.g., guests can use a pass to jump ahead of other guests without having to first obtain a paper ticket. Then, when exiting the ride or attraction, a transmitter can emit a signal turn off a LED of the display panel, indicating that the pass privilege was already utilized. Alternatively, the fully lit button can provide a group with these privileges;
2. Reserved or suggested seating areas for parades or other attractions;
3. Automatic selection for participation in parades or other attractions;
4. Reserved or preferred seating for certain shows;
5. Serving as a pass to under-utilized attractions to increase attendance at those shows;
6. Preferred seating at restaurants inside the park;
7. Discounts on merchandise or foods; and
8. Complimentary merchandise or foods.

Button With Merchandising Applications

In addition to enhancing a guest's visit to the park, the buttons 100 can also be used in connection with merchandising and marketing. For example, the button can be programmed such that a LED 112 will be illuminated when a guest:
1. Eats in certain restaurants or food locations;
2. Has a photograph taken at a guest image capture location;
3. Makes additional purchases in merchandise locations; and
4. Makes merchandise purchases over a certain dollar amount.

Illuminating all of the LEDs 112 of the button 100 by completing these activities can be used to provide one or more of the previously described benefits.

Thus, the button not only has the ability to enhance guest experience in the park, but when viewed as a merchandise concept, it can serve as a tie-in to other marketing applications and operational groups. The button can also be marketed and developed as a "limited edition" souvenir or "collectable."

Using of Display Device After Leaving Theme Park

The button 100 is also useful after a guest leaves the park. For example, LEDs 112 can be illuminated based on activities or purchases at affiliated restaurants and resorts. Buttons 100 with illuminated LEDs 112 can then be rewarded with discounted food or merchandise.

Further, the buttons can be configured to receive radio or digital TV broad-band signals. This provides the opportunity for the device to continue interacting with the guest after he or she leaves the park. For example, the button can be configured to recognize certain audio patterns or signals from televisions, radios, or computers.

Components of Display Device and System

Having described example applications of the button 100 and its general operation within the park, following is a more detailed description of the circuitry included within the button 100.

Figure 13:
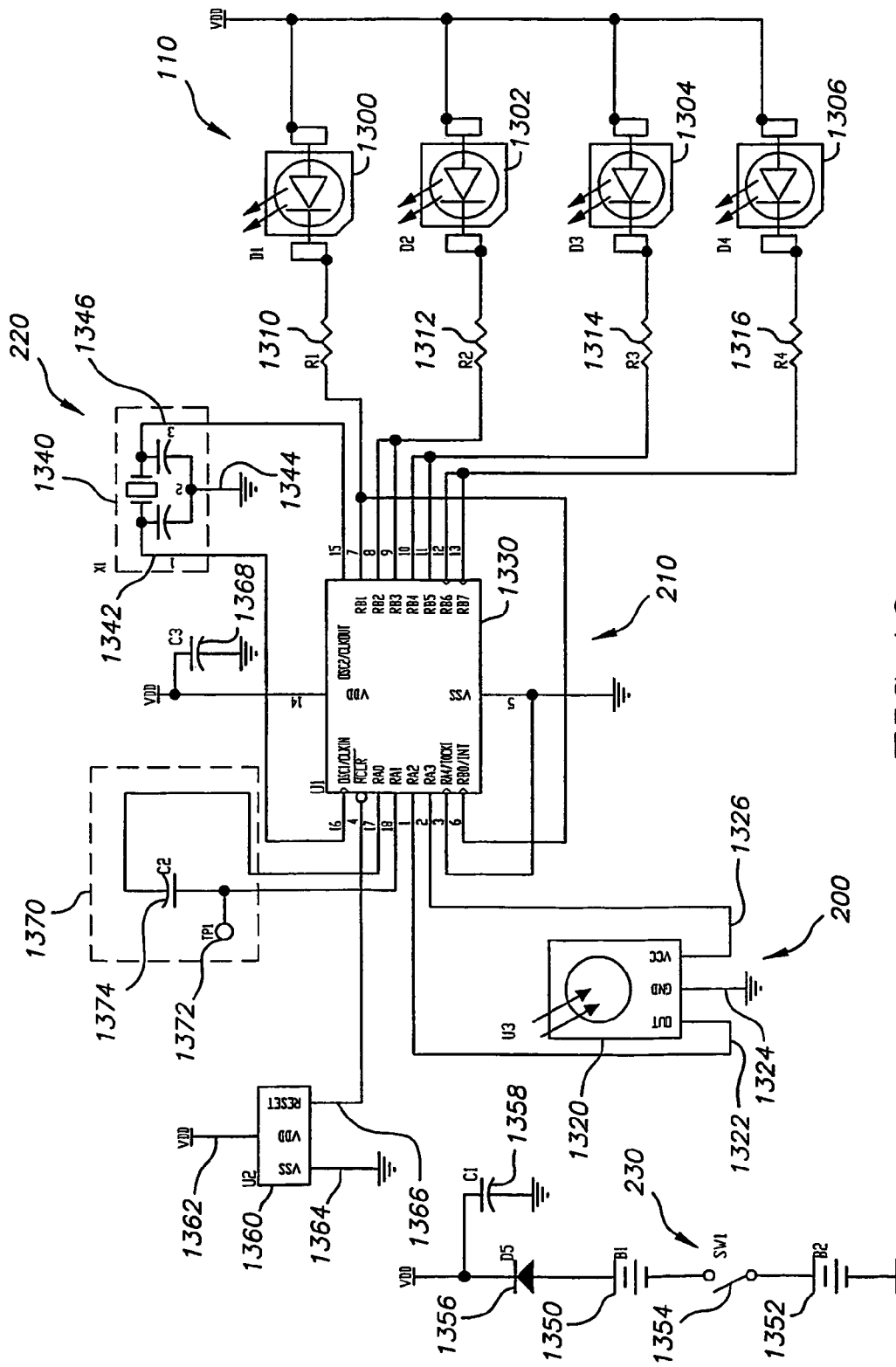
FIG. 13 is a schematic diagram of one embodiment of the circuit components of the location sensitive button.

FIG. 13 illustrates a general electrical schematic diagram of one embodiment of the circuit within the location sensitive button.

The circuit components of the button 100 include a display base 110 having indication units 112 (e.g., LED's 1300, 1302, 1304, and 1306) with current limiting resistors 1310 (e.g., 33 Ohm), 1312 (e.g., 75 Ohm), 1314 (e.g., 75 Ohm), and 1316 (e.g., 33 Ohm), a receiver-decoder 200 (e.g., IR photodetector 1320 with output pin 1322, ground pin 1324, and power pin 1326), a programmable control circuit 210 (referred to as micro-controller 1330 for simplicity) with a power input, a ground, and programmable inputs and outputs), a clock or resonator 220 (e.g., ceramic resonator 1340 with a first clock output 1342, ground output 1344, and a second clock output 1346), a power supply 230 (e.g., 3 Volt batteries 1350 and 1352, switch 1354, diode 1356 (e.g., 1N4148), and capacitor 1358 (e.g., 10 microfarad), a voltage monitor 1360 with ground 1364, Vdd 1362, reset 1366, and capacitor C3 1368 (e.g., 0.01 microfarad), and a proximity switch circuit 1370 with a test point 1372 and a capacitor 1374 (e.g., 0.01 microfarad). Each of these components and their interconnections are described in further detail.

Indication Units

The LED indication units 1300, 1302, 1304, 1206 of the display base 110 can include Vishay Telefunken brand LEDs manufactured by Vishay Intertechnology, Inc., 63 Lincoln Highway, Malvern, Pa. These LEDs 112 can be various colors, e.g., white, yellow, red, and blue, e.g., part nos. TLWY7600 (yellow), TLWW7600 (white), TLWR7600 (red), and TLWB7600 (blue). These LEDs are bright, readable in daylight conditions, and provide a rugged and precisely located light source on the circuit board. Those skilled in the art will recognize that other LEDs and other light sources with similar brightness and power consumption can also be used.

In one embodiment as illustrated in FIGS. 1A-E and 2A-E, the display base includes 4 LEDs, In this example, one LED should be a white LED, the other three being selected from different colors (e.g. red, yellow, blue, or green). A further example is illustrated in FIG. 8 (12 LEDs and 1 Show LED).

Eight micro-controller 1330 outputs are configured to serve as a sink for forward current through the LEDs. Each of the four LEDs is connected to a pair of outputs so the forward current through the LED can be maximized without damaging the micro-controller 1330 or using any additional external components such as transistors."

More specifically, the circuit in FIG. 13 is designed so that the anode of each LED is coupled to the power supply 230. As a result, if the output of the micro-controller 1330 is high, the LEDs are not illuminated. If the receiver-decoder 200 detects an IR signal and the micro-controller 1330 provides a control output to illuminate the LED, the micro-controller 1330 output is switched low. As a result, current flows through and illuminates the LED, through a resistor, and to the output pins of the micro-controller 1330 which serve as a sink into which the current can flow.

In this particular example, the forward current through each LED 112 is limited by resistors 1310 (33 Ohms), 1312 (75 Ohms), 1314 (75 Ohms), 1316 (33 Ohms) to limit the current to about 50 mA. Each output pin of the example micro-controller (e.g., PIC 16LF84) can sink 25 mA. Thus, when pins are paired together, they can handle or sink 50 mA of current. For example, pins RB2 and RB3, RB4 and RB5, RB6 and RB7, and RB1 and RB0 of the micro-controller 1330 are each paired together to sink 50 mA of current for each of the LEDs.

The animation programming is designed so that one LED is turned on at a time. Due to the fast switching speed of the LEDs, they appear to be on when cycling through 4 LEDs in 4 ms intervals.

Thus, in the embodiment of FIG. 13, the micro-controller 1330 outputs serve as current sinks to "indirectly" drive the LEDs 112 coupled to and driven by the power supply 230.

Figure 14:
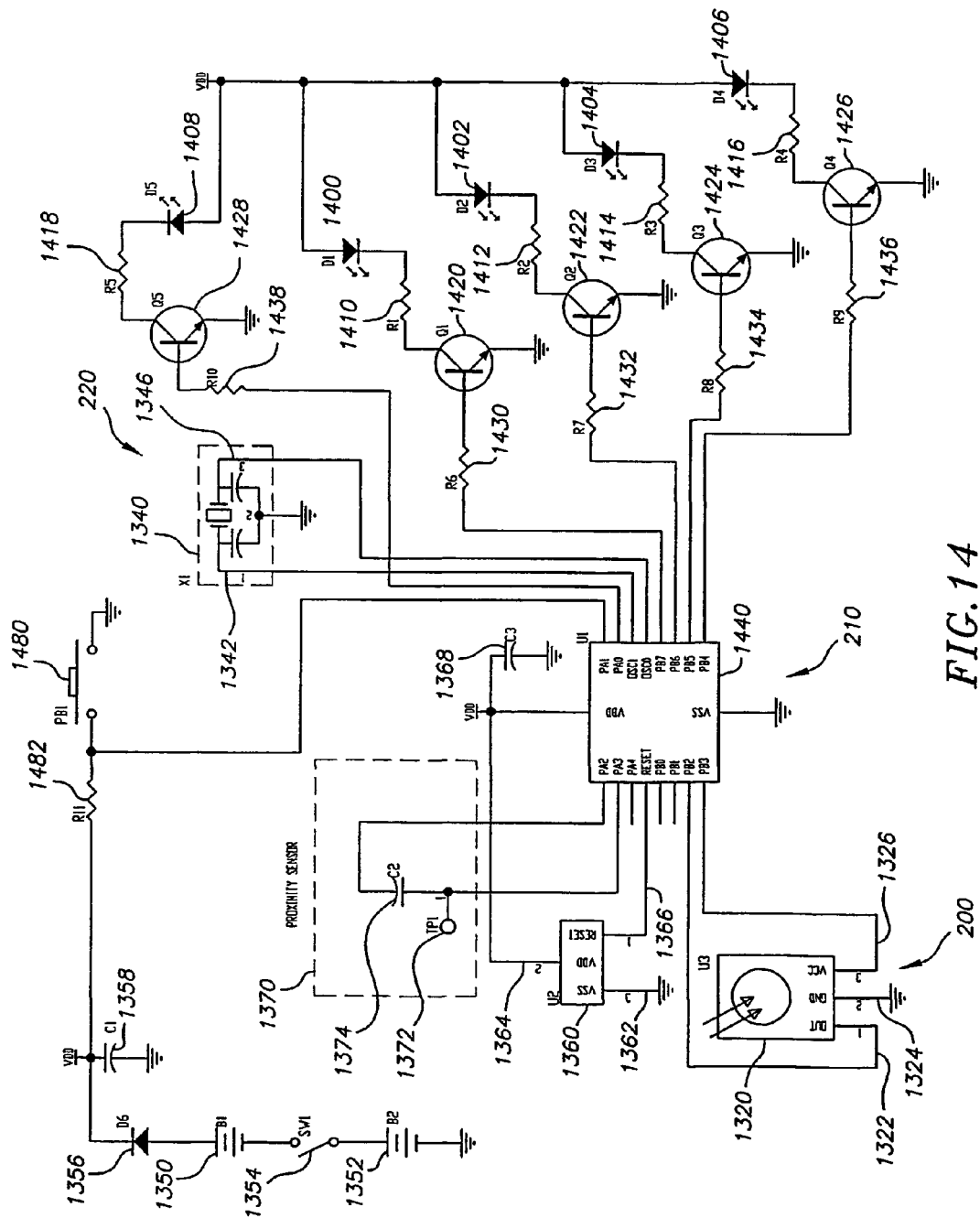
FIG. 14 is a schematic diagram of an alternative embodiment of the circuit components of the location sensitive button.

Referring to FIG. 14, in an alternative embodiment, the micro-controller can be configured to drive components which provide a path to ground for the illuminated LEDs instead of using the micro-controller outputs as current sinks. Thus it is not necessary to tie pairs of outputs together to increase the current carrying capacity. In FIG. 14, the circuitry for the button is similar to that of FIG. 13, but utilizes a different control circuit, LED components, and circuitry to drive the LEDs. Additional components are also shown in FIG. 14 illustrating the means for the devices to communicate with each other and provide for additional user inputs.

Four outputs of the micro-controller 1440 drive four respective "NPN" transistors 1420, 1422, 1424, and 1426 through current limiting resistors 1430, 1432, 1434, and 1436. Transistor 1420 is turned on when the PB7 output from the micro-controller 1440 is a high signal through resistor 1430. As a result, the white LED 1400 is illuminated since current flows from the power supply 230, through LED 1400, resistor 1410, transistor 1420, to ground. Similarly, transistor 1422 is turned on if the PB6 output from the micro-controller 1440 is switched to a high signal through resistor 1432 to turn on transistor 1422. As a result, the yellow LED 1402 is illuminated since current flows from the power supply 230, through LED 1402, resistor 1412, transistor 1422, to ground. The red and blue LEDs 1404 and 1406 can be illuminated in a similar manner through the use of transistors 1424 and 1426 and resistors 1414, 1416, 1434, and 1436.

The LED 1408 is an IR LED producing light with a wavelength between 900 and 950 nanometers (e.g. Vishay Telefunken part no. TSML3700). LED 1408 can be illuminated in a similar manner to the other LEDs by using a high signal on the PA0 output from the micro-controller 1440 to activate the transistor 1428 through the current limiting resistor 1438. The resistor 1418 limits the current flowing through LED 1408. By rapidly switching the transistor 1428, IR code signals can be sent from the device to other devices in the vicinity. This feature allows the device to behave similar to the mobile transmitters 400 described earlier.

The momentary contact pushbutton 1480 is used to provide a low signal input to the PA1 input of the micro-controller 1440. This input is normally held high through the pull-up resistor 1482. This pushbutton 1482 can perform the similar function to the pushbutton 560 on the mobile transmitter 400 and can be used to initiate animation sequences. Those skilled in the art can readily select the resistance values for this implementation.

IR Receiver/Photodetector

The receiver-decoder 200 detects and decodes the coded signals emitted from the transmitters 400. If IR transmitters are used, the receiver-decoder 200 can be a Vishay Telefunken brand IR receiving module which includes an IR photodetector and preamplifier integrated circuit, e.g., part no. TSOP1838SS3V also manufactured by Vishay Intertechnology. This photodetector selectively detects IR signals at a particular frequency or range of frequencies (e.g., IR signals at 38 KHz for this particular IR module).

When IR signals are received by the IR photodetector, it converts the IR signals into a Transistor Transistor Logic (TTL) level voltage signal (0 to 5V). The converted voltage signal is provided to an input of the micro-controller. These input signals are multi-byte serial messages based on conventional RS-232 protocols and transmitted at a rate of 2400 bits per second.

The example photodetector includes three pins: an output OUT 1322 (active low), ground GND 1324, and power Vcc 1326. The output pin OUT 1322 is coupled to an input of the micro-controller and provides it with a signal corresponding to the transmitted IR signal. The power pin Vcc 1326 is also coupled to an input of the micro-controller to allow for the power of the receiver to be switched on and off as needed to conserve power.

Control Circuit

Animation sequences are stored as programs within a control circuit 210, e.g., programmable micro-controller or microprocessor ("micro-controller"). The micro-controller processes various types of input data, e.g., from the receiver-decoder or photodetector 200 and proximity switch 1370, to determine which program/animation sequence should be executed and displayed.

The micro-controller can be one of the several commercially available components. For example, the micro-controller in FIG. 13 can be micro-controller part no. PIC16LF84, manufactured by MicroChip, Inc., 2355 West Chandler Road, Chandler, Ariz. This micro-controller is useful in the configuration of FIG. 13 because of the ability of the input/output pins to each sink up to 25 mA of current. Thus, the outputs can be tied together to sink up to 50 mA of current, thereby enabling the LEDs to sink current to the tied outputs through the current limiting resistors.

Other micro-controllers can that can also be used include PIC16C56, PIC16C57, and PIC16C711 micro-controllers, also manufactured by MicroChip, Inc. Further, these micro-controllers can also be used in the circuit of FIG. 14 which uses the output pins as a source of current to drive circuit components rather than as a current sink.

The function of the micro-controller can also be performed by specialized versions of these devices known as "masked ROM" devices. Masked ROM devices are available at much lower production costs but typically cannot be re-programmed to change the embedded software. Masked ROM devices are available from many different vendors with electrical characteristics similar, if not identical, to the MicroChip Inc. parts. One example Mask ROM microprocessor that can be utilized is microprocessor part no. EM78P156E manufactured by Elan Microelectronics Corp., No. 12, Innovation Road I, Science-Based Industrial Park, Hsinchu City, Taiwan.

Indeed, those of ordinary skill in the art will recognize that various other micro-controllers and microprocessors can be utilized based on the following design considerations: the number of available buttons for input and outputs, the operating frequency range, hardware features such as timers and interrupts, program memory size, and amount of power it can supply (source or sink) to other components in the circuit. Production considerations may also impact characteristics of the micro-controller. For example, the micro-controller is likely to have a masked Read Only Memory (ROM) design which precludes reprogramming of the device after it has been manufactured. The production micro-controller will also typically have lower sink/source currents available for their output buttons. As a result, the embodiment utilizing transistors and base current resistors to switch the power to the LEDs can be used as illustrated in FIG. 14.

Software Programs Stored in Micro-controller

The programs corresponding to or representing animation sequences stored within the control circuit 210 can be written in the C programming language or in the native assembly language of the particular micro-controller. Each animation program is identified internally with a show number (e.g. Show 0, Show 1, Show 2, etc.). Stored within the permanent memory of the micro-controller is a tabular arrangement of the sequence and time duration of the LEDs to be illuminated for each show number. When the IR signal for a particular show number is received, the micro-processor retrieves the corresponding table. Starting at the top of the table, the first LED is illuminated and a timer-counter is started to measure the elapsed illumination time. When the first time duration contained in the table is exceeded, the micro-processor steps to the next entry in the table, illuminates the corresponding LED, and restarts the timer-counter to measure the next elapsed illumination time. This process is continued until the last entry in the table is reached. Once the last LED has been illuminated for its programmed time duration the animation sequence is over and the micro-processor is prepared to receive another IR signal. Using this tabular arrangement, complex patterns or sequences can be designed providing for a wide variety of animation sequences.

Specialized sequences can also be constructed utilizing well known Pulse-Width Modulation (PWM) techniques to vary the brightness of the LEDs. Other sequences can be specially constructed to mimic the rhythmic beat of musical instruments or a human heartbeat. Patterns can also be constructed to send information by illuminating the LEDs in patterns associated with the widely known Morse Code system. Those skilled in the art will recognize that similar software code can be generated to play other shows, sequences, and patterns of LEDs or other outputs depending on the desired output, pattern, or sequence.

Clock Circuit/Resonator

The time base for the micro-controller is provided by a clock source. One example clock source that can be used is a ceramic resonator 130 with integral capacitors, e.g., part no. EFOEC2004A5 (frequency of 2.00 MHZ, accuracy of +/−0.5%) manufactured by Matsushita Electrical Industrial Co., Ltd., 1006 Kadom, Kadoma-shi Osaka, 571 Japan, and sold by the Panasonic Industrial Co., Semiconductor Sales Group, Two Panasonic Way, 7G-5, Secaucus, N.J.

Increased timing accuracy can be obtained by using a crystal instead of a resonator. Other frequencies and components can be used if the timing resolution allows the accurate decoding of the IR signals by the micro-controller. Further, those of ordinary skill in the art will recognize that other clock sources can be used in the circuits of FIGS. 12 and 13 to match the selected micro-controller specifications.

Proximity Switch

Another feature of the electronic circuits of FIGS. 13 and 14 is a proximity switch circuit 1370. The proximity switch 1370 circuit provides a guest the ability to control animation sequences. The proximity switch 1370 can be incorporated into the design of the button 100 and triggered by the guest bringing his or her finger close to or in contact with test point TP 1372. In response, the micro-controller 210 provides outputs signals which initiate an animation sequence.

One example proximity switch circuit 1370 uses a capacitor (C2) 1374 (e.g., 0.01 microfarad) connected across two input pins of the micro-controller. In operation, the microcontroller alternately charges and discharges the capacitor 1374 and receives the voltage as an input. The micro-controller measures the time (measured in processor instruction cycles) required for the voltage to reach the threshold level. The time required to reach the threshold level will vary depending on if a person has their finger on or near the test point TP 1372. This charge-pump test technique in a capacitive sensing circuit is conventionally constructed and generally known to those skilled in the art, and is not detailed further.

By comparing the current charge pump time, i.e., the time required to reach the threshold level, with a calibration value obtained earlier, the micro-controller can determine if someone is touching or approaching the proximity of the test point 1372.

When the micro-controller detects that the proximity switch has been activated, a special animation sequence is initiated and output by the LED indication units.

The manner in which the proximity switch 1370 is integrated into the button considers various design factors, including:

1. The cosmetic cover of the device are non-conductive. On the inside surface of the cover, a conductive area must be provided and electrically connected to TP 1 1372. This area defines the contact area for the proximity switch 1370.
2. The area of the printed circuit board beneath the micro-controller and the proximity circuit 1370 components are ground shielded.
3. In order to reduce the space consumed by the circuit board within the button, the micro-controller can be surface mounted. The surface mounting technique also accommodates the proximity switch circuit 1370.
4. Pins from the micro-controller connecting to the capacitor C2 1374 are isolated from the guest's body, precluding through-hole mounted micro-controllers.
5. The proximity switch circuit 1370 can be sensitive to fluctuations in the power supply 230 and electrical noise in the circuit. Software features "de-bounce" the switch 1370 can provide a low-pass filter on the data.

Thus, by incorporating a proximity switch circuit 1370 into the button, the guest is allowed to control the playing of the animation sequences.

Power Supply

The power supply 230 provides power to the electrical components of the button 100 and can be, for example, a series arrangement of two 3-volt batteries 1350, 1352. Example batteries include two lithium coin-cell batteries, model no. CR2032 rated at a capacity of 220 mA, which are also available from Panasonic.

A switch 1254 is positioned between the batteries 1350, 1352 to disconnect the circuit from the power supply 230 and to turn the device off during shipping or when it is not in use.

Additionally, a protective diode 1356 (e.g., 1N4148) (available from many sources, including Vishay Intertechnology), connected through capacitor 1358 (e.g., 10 microfarad) to ground protects the circuit if the batteries 1350, 1352 are installed improperly.

Voltage Monitor

The voltage level provided by the power supply 230 is monitored by a voltage monitor 1360, e.g., a micro-controller supervisory integrated circuit part no. MCP809T-270I, also available from MicroChip, Inc. which insures reliable operation of the circuit as the voltage level of the batteries tends to drop during normal use. The example voltage monitor 1360 includes a Vss pin 1364 to ground, a power or Vdd pin 1362, and a reset pin 1366. The Vdd pin 1362 is connected to the power supply. The Reset pin 1366 is connected to the corresponding Reset pin on the micro-controller. The voltage monitor 1360 is designed so that when the supply voltage Vdd 1362 drops below 2.7 volts, the output of the voltage monitor is brought low (to ground level or Vss 1364). The micro-controller senses this low signal and resets the embedded software.

Power Management

To conserve power, the device can include a power switch for the guest to activate when the device is to be used and to turn off when it is not in use.

Further, the micro-controller of the display device can be configured to operate at three different power levels depending on whether the device is manually activated with, e.g., a power switch, and how often an IR signal from a transmitter 400 is detected.

For example, when the device is activated with switch SW 1 1354, the device enters an Infrared Active (IRACTIVE) mode and continuously scans the receiver-decoder's 200 output for the detection of any valid IR signals from a transmitter. The device is also configured to continuously scan for an activation of a proximity switch 1370. Since the circuit is active most or all of the time, this mode consumes the most power.

However, if the guest is not in the vicinity of a transmitter after a specified time (e.g., 15 minutes) no signals will be detected. As a result, the device enters an IR standby (IR-STANDBY) mode in which the circuit intermittently searches for signals. In this mode, the micro-controller is still fully functional and operates at full power, but the duty cycle on the IR receiver-decoder is reduced to 10%, thereby conserving power.

For maximum power conservation, when no IR signals are detected and there are no proximity switch 1370 activities for a longer period of time (e.g., 30 minutes), the device enters an IR shutdown mode (IRSHUTDOWN). The receiver-decoder is turned off and the controller periodically checks for proximity switch 1370 events. The micro-controller is also placed into its lowest power consumption state. In the event a guest presses the proximity switch 1370, the circuit returns to a standby mode.

When the receiver-decoder detects a valid signal from a transmitter, the circuit is placed in the active mode. However, if the receiver-decoder detects a transmitter signal which calls for a delayed animation sequence, then the circuit remains in IRACTIVE mode until the animation sequence is played. The active mode is preferred since delayed sequences typically involve a delay counter and tracking elapsed time.

Example Circuit for Hand Held Display Module

Figure 15:
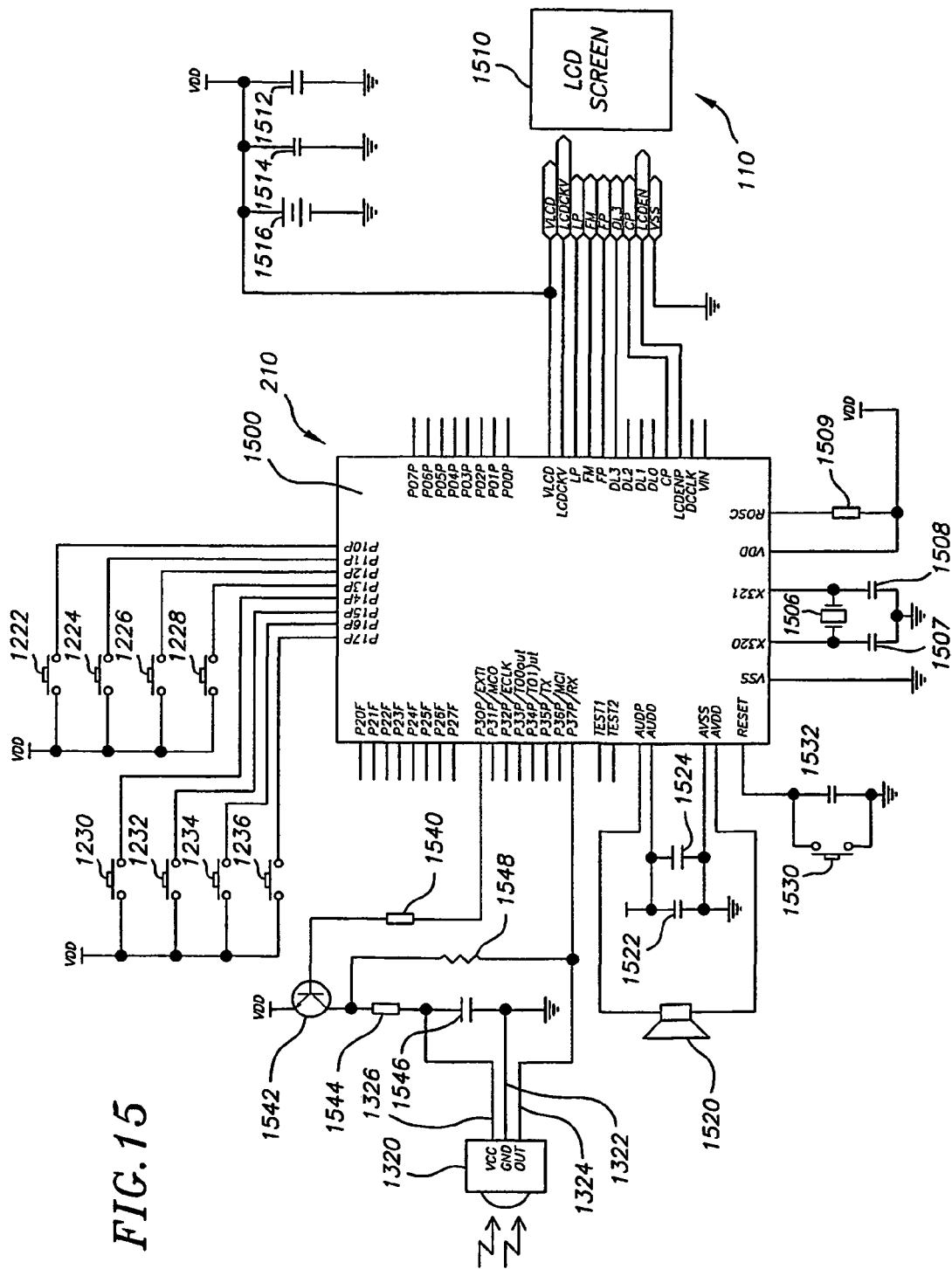
FIG. 15 is a schematic diagram of an alternative embodiment of the display device which includes an LCD screen and user input buttons and is used as part of a game of skill or knowledge.

FIG. 15 illustrates the circuit of the embodiment directed to a hand held module. As previously described with reference to FIG. 12, the hand held module can be used in connection with a variety of games to entertain the guest. This embodiment operates on the same principles as the display device in the form of a button by receiving and decoding coded signals from an IR transmitter to provide a control signal. As a result, the micro-controller control circuit generates output signals which are processed to provide a predetermined visual display on the LCD screen in the form of a game. The guest can then play them game through control pads.

The primary components of the hand held module circuit include a micro-controller 1500, LCD screen 1510, control pads (1222, 1224, 1226, 1228, 1230, 1232, 1234, and 1236) an IR receiver-decoder 1320, a speaker 1520, and a reset button 1530. One example micro-controller that can be utilized is part no. SPL132A, manufactured by Sunplus Technology, 19 Innovation Road I, Science-based Industrial Park, Hsin-Chu 300, Taiwan. This example micro-controller uses an 8-bit microprocessor, 32 programmable Inputs/Outputs, and a LCD interface that can be programmed to implement various LCD dot matrix applications.

Of course, those skilled in the art will recognize that other micro-controller for storing games and driving a LCD screen can be used. Various serially controllable graphics LCD screens 1510 can be utilized with micro-controllers that implement LCD dot matrix applications. For example, the micro-controller and LCD screen can be configured such that 64×64, 128×64, and 240×64 pixel LCD screens can be used depending on the micro-controller LCD dot matrix capabilities. Example LCD screens are available from various sources, including Scott Edwards Electronics Inc., 1939 S. Frontage Road, Suite F, Sierra Vista, Ariz. and Taiwan Sunlike Display Tech Corp., No.11-2, Chien-Kuo Road. T. E. P. Z. Taichung Hsien, Taiwan. The IR receiver-decoder 1320 can be the same component as used in FIGS. 13 and 14, or another appropriate receiver-decoder.

In use, the receiver-decoder 1320 is activated or powered on based on the output of pin P30P of the micro-controller 1500. When the output of pin P30P is high, then a voltage is supplied through current limiting resistor 1540 into the base of PNP transistor 1542. As a result, transistor 1542 is turned on, and the power source Vdd, coupled to the emitter, is provided through current limiting resistor 1544 into the power Vcc input 1326 of the receiver-decoder 1320. As a result, the receiver-decoder is powered on. Capacitor 1546 is coupled between Vcc 1326 and ground to filter out noise.

In this configuration, a low signal on input P37P of the micro-controller indicates that the receiver-decoder is detecting an IR signal. Thus, resistor 1548 is a pull up resistor which ensures that when the receiver-decoder 1320 is not detecting IR signals (a high input), that the input P37P to the micro-controller 1500 is held high to indicate the same. This signal can then be used to conserve power as previously described.

When the receiver-decoder 1320 detects an IR signal, the micro-controller 1500 is triggered to provide outputs to the LCD screen 1510 and to the speaker 1520 corresponding to that IR signal. As a result, the game images and sounds are provided to the guest through the LCD screen 1510 and speaker 1520. The guest can then play the game through the control pads. The speaker circuit includes capacitors 1522 and 1524 for noise suppression. The LCD circuit also includes capacitors 1512 and 1514 for a similar purpose and is powered by battery 1516.

The micro-controller can also be reset through switch 1530, coupled to capacitor 1532 to ground. The reset function is useful if, e.g., new or different games are loaded in the program memory of the micro-controller.

Finally, the micro-controller 1500 is driven by a 32.768 kHz clock 1506 coupled to ground through capacitors 1507 and 1508 for noise suppression. The micro-controller 1500 is powered by supply Vdd, and current limiting resistor 1509.

Thus, with the hand held module, the guest can be entertained with many different programmed games or other displays in response to IR signals received from transmitters throughout the park.

IR Communication Codes

Having described the circuit components of the location sensitive display device 100 and how it operates using IR communications, following are further details of the IR codes and their processing by the control circuit 210. The IR codes are transmitted using conventional asynchronous serial data transmissions where each character or byte has a fixed number of bits and each bit has a fixed period of time. These communication protocols are well known and implemented in computers and small micro-controllers as represented in FIGS. 13-15.

Specifically, the devices represented in this invention transmit data at a baud rate of 2400 bits per sec. A start bit and a stop bit is added to each byte of data as it is transmitted. Therefore, each transmitted byte consists of 10 bits and requires 4.167 milliseconds to transmit. However, those skilled in the art will appreciate that other data rates are possible and that a transmission rate of 2400 bits per second is merely an illustrative example.

The IR Codes utilized by this invention are constructed into messages consisting of multiple bytes of data. The messages can vary in length from 5 to 17 bytes depending on the application and the type of animation sequence desired. These data bytes are used to uniquely identify specific locations within the entertainment environment. The data bytes can also be constructed to uniquely identify the current time of day or the elapsed time during a particular entertainment show or attraction. Messages can also be constructed to specify the specific animation sequence desired for the display device to playback on the LEDs or LCD screen. As described earlier, the message can also be constructed to specify the length of time a certain animation sequence is to be played in a Timed Event Code. Furthermore, the message can also be constructed to specify a time delay before the animation is to begin in a Delayed Event Code. Those skilled in the art will appreciate the only requirement for these messages is that each location must have a unique identification and the receiving device must be programmed to respond appropriately to the location, time, and show information transmitted.

Certain IR codes and messages have been reserved for special purposes. For example, one code is used to place the device into a demonstration mode where multiple animation sequences are operated in a continuous loop for an extended time. This feature is useful as a demonstration means for vendors to display the devices while they are selling the product. Certain codes can also be reserved for special purposes such as indicating levels achieved during the multiplayer game. Another IR code can be reserved to place the device in low-power or sleep mode and a separate IR code is used to force the device to emerge from the low-power mode and return to normal operation. The IR coded message also includes a checksum value—the use of which is also widely implemented in asynchronous communications. After receiving a message, the embedded software on the receiving device computes the checksum of the received message and compares it with the checksum value transmitted as part of the message. If the computed checksum does not match the transmitted checksum, an error is assumed to have occurred during the transmission or reception of the message and the received message is ignored.

The use of such IR codes provides for reliability, flexibility, and expandability for various uses and applications within entertainment environments.

Method of Providing Animation Sequences

Considering the foregoing description of the components utilized in and with the display device 100, a method of providing animation sequences within an entertainment environment having one or more transmitters which emits a coded signal utilizing a location sensitive display device can be performed as follows.

First, animation sequences are programmed into a microcontroller or other programmable control circuit. Then, the coded signal from the transmitter is then detected with a decoder-receiver unit such as an IR photodiode. A control signal is generated by the decoder-receiver unit in response to the detected coded signal.

The control signal is then provided to the programmable control circuit which executes the control signal and generates output signals which result in the illumination of indication units in a sequence. As a result, a predetermined visual display is provided by the indication units which can be an LED, a sequence, pattern, or changing brightness of LEDs which are displayed immediately, for a particular duration, after a specified delay, or repeated. Further the predetermined visual display can be the display of trivia questions or answers or other park information on a LCD screen.

The predetermined visual display can then be used as part of a mass audience effect, parade, fireworks display, to provide interaction between a guest and a prop, character, or information booth related to the entertainment environment. Further, the predetermined visual display can be used as part of a game; as a basis for providing merchandise discounts, reserved seating, or reduced wait time for an attraction. For example, the alternative embodiment of the display device directed to a hand held module with a LCD screen can be used in connection with a trivia game.

In addition, a user can be provided with control as to when to activate the predetermined visual display through the use of a switch such as a proximity switch, e.g., a capacitive proximity switch. When the capacitive proximity switch is used, a presence signal is generated in response to an object approaching or contacting a predefined area to indicate to the programmable control circuit that a visual display should be initiated.

Having described various embodiments of the present invention, those skilled in the art will recognize that the location sensitive button 100 overcomes the shortcomings of conventional location sensitive devices and provides an enhanced entertainment experience. The button 100 can be used in various applications and allows a guest to control when an animation sequence can be output or displayed. Guests are no longer limited to keeping objects relating to the entertainment environment as a souvenir or gift since the object can become part of the entertainment experience within various entertainment venues.

The foregoing description of embodiments of the present invention have been presented for the purposes of illustration and description. It is not intended to be exhaustive or to limit the invention to the precise forms disclosed. Many modifications and variations are possible in light of the above teaching. For example, the location sensitive button 100 can be used with many different communication systems, objects or toys, displays and/or sounds. Further the button 100 can be used in connection with many different applications, both for enhancing a guest's entertainment experience and for merchandising and marketing purposes. It is intended that the scope of the invention be limited not by this detailed description, but rather by the claims appended hereto.

What is claimed is:

1. A display device for use in an environment comprising:
   a display base provided with a plurality of indication units which illuminate when activated;
   a broadcast receiver-decoder unit coupled to the base which detects a non-specific broadcast receiver-decoder unit coded sequencing signal emitted by any one of a plurality of broadcast transmitters within the environment, wherein at least one of the transmitters is capable of transmitting a different coded sequencing signal from the sequencing signal transmitted by at least one of the other transmitters, and the broadcast receiver-decoder unit decodes the coded sequencing signal when the receiver decoder unit is within a predetermined vicinity of the transmitting broadcast transmitter to provide a sequencing control signal;
   a microprocessor control circuit coupled to said receiver-decoder unit and to said indication units and having a stored program, said program directing said control circuit to generate a sequence of output signals based upon said control signal, said sequence of output signals activating and illuminating said plurality of indication units in a sequence determined by said sequence of output signals to provide a predetermined visual display on any said display device that is located within the predetermined vicinity.

2. The display device of claim 1, wherein each display device comprises an object which is wearable by a person on his or her person or clothing as an item of adornment.

3. The display device of claim 2, wherein said item of adornment is worn by the person as a necklace.

4. The display device of claim 2, wherein said display base, receiver-decoder unit, and control circuit are integrated into said item of adornment.

5. The display device of claim 1, wherein said receiver-decoder unit comprises an infrared photodetector.

6. The display device of claim 1, wherein said indication units of said display base include one or more Light Emitting Diodes (LEDs).

7. The display device of claim 6, wherein at least one of the indicator units in said predetermined visual display is selected from the group consisting of: an illuminated LED; an LED having a change in brightness; a plurality of LEDs illuminated in a sequence; a plurality of LEDs illuminated in a chase sequence; a plurality of LEDs illuminated in a pattern; and a plurality of LEDs illuminated in a blinking pattern.

8. The display device of claim 1, wherein said indication units are part of a Liquid Crystal Display (LCD) screen.

9. The display device of claim 8, wherein said predetermined visual display provided on the LCD screen comprises a display which is part of a game selected from the group consisting of: a trivia game, a word game, a maze game, a role playing game, and a strategy game.

10. The display device of claim 1, wherein said predetermined visual display is synchronized with an event in the environment.

11. The display device of claim 10, wherein the event comprises a parade.

12. The display device of claim 1, wherein said predetermined visual display is synchronized with a display in the environment.

13. The display device of claim 12, wherein the display in the environment comprises a fireworks show.

14. The display device of claim 1, further comprising a switch coupled to an input of said control circuit, said switch providing a user control to trigger the predetermined visual display.

15. The display device of claim 14, said switch comprising a capacitive proximity switch, wherein
   said control circuit provides a voltage signal, the voltage signal reaches a threshold value dependent on a capacitance of said capacitive proximity switch, and
   the time for the voltage level to reach the threshold value increases as an object moves closer to a test point of said capacitive proximity switch,
   thereby activating said proximity switch and generating the presence signal.

16. The display device of claim 1, wherein said display device is designed as an object selected from the group consisting of: a pin; a button; a toy; a plush toy; a hand held module; and a prop related to the environment.

17. The display device of claim 1, wherein the environment is selected from the group consisting of: a theme park; a resort; a cruise ship; hotel; and an educational setting.

18. The device of claim 1 wherein the device only receives data signals and does not transmit any data signals.

19. A system for use in an environment, comprising:
a plurality of broadcast transmitters, wherein at least one transmitter of said plurality of transmitters is capable of emitting a different non-specific broadcast receiver-decoder unit coded sequencing signal; and
a display device that comprises:
a display base provided with a plurality of indication units which illuminate when activated;
a broadcast receiver-decoder unit coupled to the display base configured to decode the nonspecific broadcast receiver-decoder unit coded signals emitted from any one of said plurality of transmitters when that receiver decoder unit is within a predetermined vicinity of the one of the transmitters and to provide a sequencing control signal in response thereto;
a microprocessor control circuit coupled to said receiver-decoder unit and said indication units and having a stored program, said program directing said control circuit to generate a sequence of output signals based upon said control signal, said sequence of output signals activating and illuminating said plurality of indication units in a sequence determined by said sequence of output signals to provide a predetermined visual display on any said display device having the receiver-decoder unit therein that is within the predetermined vicinity.

20. The system of claim 19, wherein said display base, receiver-decoder unit, and control circuit are included in an object which is wearable by a person on his or her person or clothing as an item of adornment.

21. The system of claim 20, wherein said item of adornment is worn by the person as a necklace.

22. The system of claim 19, said display device is designed as an object selected from the group consisting of: a pin; a button; a toy; a plush toy; and a prop related to the environment.

23. The system of claim 19, wherein one or more transmitters of said plurality of transmitters comprises an infrared transmitter.

24. The system of claim 19, wherein one or more transmitters of said plurality of transmitters is selected from the group consisting of: a low power radio frequency transmitter; an inaudible audio signal transmitter; an audible audio signal transmitter; a Global Positioning System transmitter; and a transmitter configured for communications through a low power wireless networking protocol.

25. The system of claim 19, wherein one or more transmitters of said plurality of transmitters is mounted in an information display.

26. The system of claim 19, wherein one or more transmitters of said plurality of transmitters is mounted at an entrance of the environment.

27. The system of claim 19, wherein one or more transmitters of said plurality of transmitters is mounted at an exit of the environment.

28. The system of claim 19, wherein one or more transmitters of said plurality of transmitters is mounted at an entrance of an attraction in the environment.

29. The system of claim 19, wherein one or more transmitters of said plurality of transmitters is mounted at an exit of an attraction in the environment.

30. The system of claim 19, wherein one or more transmitters of said plurality of transmitters is mounted at a ticket booth.

31. The system of claim 19, wherein one or more transmitters of said plurality of transmitters is mounted at a turnstile.

32. The system of claim 19, wherein one or more transmitters of said plurality of transmitters comprises a fixed transmitter.

33. The system of claim 19, wherein one or more transmitters of said plurality of transmitters comprises a mobile transmitter.

34. The system of claim 33, wherein said mobile transmitter is attached to a parade float.

35. The system of claim 33, wherein said mobile transmitter is carried by a person associated with the environment.

36. The system of claim 19, wherein said receiver-decoder unit comprises an infrared photodetector.

37. The system of claim 19, wherein said indication units of said display base include one or more Light Emitting Diodes (LEDs).

38. The system of claim 37, wherein at least one of said indication units in said predetermined visual display is selected from the group consisting of: an illuminated LED; an LED having a change in brightness; a plurality of LEDs illuminated in a sequence; a plurality of LEDs illuminated in a chase sequence; a plurality of LEDs illuminated in a pattern; and a plurality of LEDs illuminated in a blinking pattern.

39. The system of claim 19, wherein said indication units are part of a Liquid Crystal Display (LCD) screen.

40. The system of claim 39, wherein said predetermined visual display provided on the LCD screen comprises a display which is part of a game selected from the group consisting of: a trivia game, a word game, a maze game, a role playing game, a strategy game, a treasure hunt game, and a team game.

41. The system of claim 39, further comprising a user input button located on the face of the display device, wherein input from the user through the input button affects the predetermined visual display.

42. The system of claim 19, further comprising a switch coupled to an input of said control circuit, wherein said switch provides a user control to trigger said predetermined visual display.

43. The system of claim 42, said switch comprising a capacitive proximity switch, wherein
said programmable control circuit provides a voltage signal,
the voltage signal reaches a threshold value dependent on a capacitance of said capacitive proximity switch, and
the time for the voltage level to reach the threshold value increases as an object moves closer to a test point of said capacitive proximity switch,
thereby activating said capacitive proximity switch which generates the presence signal.

44. The system of claim 19, wherein the environment is selected from the group consisting of: a theme park; a resort; a cruise ship; a hotel; and an educational setting.

45. The system of claim 19, further comprising a central control system, said central control system configured to program one or more transmitters of said plurality of transmitters to synchronize said predetermined visual display of said indication units with a display or event in the environment.

46. The system of claim 45, wherein said central control system programs said one or more transmitters using a serial signal sent over a serial data link to said transmitter.

47. The system of claim 46, wherein said one or more transmitters include a transmitter control circuit and a transmission circuit, wherein
said transmitter control circuit configured to convert the serial signal from said central control system into an infrared signal, the infrared signal being provided by said transmitter control circuit to said transmission circuit, and
said transmission circuit configured to transmit the coded infrared signal.

48. The system of claim 19, wherein said predetermined visual display is triggered based on a location of the display device within the environment.

49. The system of claim 19, wherein the said predetermined visual display is part of a mass audience effect.

50. The system of claim 19, wherein said predetermined visual display is synchronized with an event in the environment.

51. The system of claim 50, wherein the event comprises a parade.

52. The system of claim 19, wherein said predetermined visual display is synchronized with a display in the environment.

53. The system of claim 52, wherein the display comprises a fireworks show.

54. The system of claim 19, wherein said predetermined output is triggered based on a user interacting with a prop associated with the environment.

55. The system of claim 19, wherein said predetermined output is triggered based on a user interacting with a character of the environment.

56. The system of claim 19, wherein said predetermined output is triggered based on a user visiting an information booth.

57. The system of claim 19, wherein said predetermined output is triggered based on user control.

58. The system of claim 19, wherein said predetermined output is triggered based on a purchase in a restaurant associated with the environment.

59. The system of claim 19, wherein said predetermined output is triggered based on a photograph being taken in the environment.

60. The system of claim 19, wherein said predetermined output is triggered based on a purchase of merchandise in the environment.

61. The system of claim 19, wherein said predetermined output is triggered based on an expenditure exceeding a predetermined amount.

62. The system of claim 19, wherein said predetermined visual display is immediately displayed.

63. The system of claim 19, wherein said predetermined visual display is displayed for a specified duration of time.

64. The system of claim 19, wherein said predetermined visual display is delayed for a specified duration of time.

65. The system of claim 19, wherein said predetermined visual display is repeated.

66. The system of claim 19, wherein the said predetermined visual display indicates a benefit to a guest of the environment selected from the group consisting of: a reduced wait time for an attraction; a reserved seat for an attraction; selection as a participant in an attraction; a merchandise discount; and a food item discount.

67. The system of claim 19 wherein the receiver-decoder unit only receives data signals and does not transmit any data signals.

68. An audio-visual device for use in an environment, wherein the environment is provided with a plurality of transmitters including at least one broadcast transmitter which is capable of emitting a different non-specific broadcast receiver-decoder unit coded sequencing signal, the device comprising:
a speaker which provides sound when activated;
a display base provided with a plurality of indication units which illuminate when activated;
a broadcast receiver-decoder unit coupled to the display base which detects the non-specific broadcast receiver-decoder unit coded sequencing signal emitted by any one of the transmitters when the the broadcast receiver-decoder unit is within a predetermined vicinity of the transmitter and decodes the coded sequencing signal to provide a sequencing control signal; and
a microprocessor control circuit coupled to said receiver-decoder unit, said speaker, and said indication units, and having a stored program, said program directing said control circuit to generate a sequence of output signals based upon said control signal, said sequence of output signals activating said speaker and said indication units to generate a sequence of predetermined sounds and visual displays according to said sequence of output signals, when any said receiver-decoder unit is within the predetermined vicinity.

69. The device of claim 68 wherein the device only receives data signals and does not transmit any data signals.

70. The device of claim 68 wherein said speaker, display base, receiver-decoder unit, and programmable control circuit are integrated into an object which is wearable by a person on his or her person or clothing as an item of adornment.

71. A display device for use in a game related to an environment, wherein the environment is provided with a plurality of broadcast transmitters, at least one of which is capable of emitting a different non-specific broadcast receiver-decoder unit coded sequencing signal, the display device comprising:
a display base provided with an indication unit which illuminates when activated;
a receiver-decoder unit coupled to the display base which detects the non-specific broadcast receiver-decoder unit coded signal emitted by the transmitter when the receiver-decoder unit is located within a predetermined vicinity of one of the transmitting transmitters and the receiver-decoder unit decodes the coded sequencing signal to provide a sequencing control signal;
one or more user input buttons on the display device; and
a microprocessor control circuit coupled to said receiver-decoder unit and having one or more stored programs representing a game,
said program directing said control circuit to generate a sequence of output signals based upon said control signal, said sequence of output signals activating said indication unit to generate a sequence of predetermined visual displays corresponding to the game when the receiver-decoder unit of any display device comes within the predetermined vicinity and receives the coded sequencing signal, the user playing the game through said one or more input buttons.

72. The display device of claim 71, wherein the game is selected from the group consisting of: a trivia game, a word game, a maze game, a role playing game, a skill game, and a strategy game.

73. The display device of claim 71, further comprising a speaker coupled to said control circuit, wherein said program directing said control circuit to generate a sequence of output signals selected by said control signal activates said speaker to generate sounds related to the game, wherein said speaker is also integrated into said hand held module.

74. The device of claim 71 wherein the device only receives data signals and does not transmit any data signals.

75. The device of claim 71 wherein the indication unit is a liquid crystal display (LCD).

76. The device of claim 71 wherein the indication unit, receiver-decoder unit, and programmable control circuit are integrated into a hand held module.

77. A game system for use in an environment, comprising:
a plurality of broadcast transmitters, at least one of the transmitters of said plurality of transmitters configured to emit a different non-specific broadcast receiver-decoder unit coded sequencing signal corresponding to a game; and
a display device comprising:
a display base provided with a an indication unit which illuminates sequences corresponding to the game when activated;
a broadcast receiver-decoder unit coupled to the base which detects the non-specific broadcast receiver-decoder unit coded signal emitted by the transmitter when the broadcast receiver-decoder unit transmitter is located within a predetermined vicinity of the transmitter and the broadcast receiver-decoder unit decodes the coded sequencing signal to provide a sequencing control signal;
one or more user input buttons on the display device; and
a microprocessor control circuit coupled to said receiver-decoder unit and having one or more stored programs representing the one or more games, wherein at least one of said one or more programs is capable of directing said control circuit to generate a sequence of output signals based upon said sequencing control signal, said sequence of output signals activating said indication unit to generate a sequence of predetermined visual displays corresponding to the game when any said broadcast receiver-decoder unit detects the coded sequencing signal, wherein the user interacts with the game through said one or more input buttons.

78. The game system of claim 77, wherein the game is selected from the group consisting of: a trivia game, a word game, a maze game, a role playing game, a skill game, and a strategy game.

79. The game system of claim 77, wherein a different game is triggered in different locations in the entertainment environment based on a unique coded sequencing signal being emitted from respective transmitters associated with the different locations.

80. The game system of claim 77, further comprising a speaker coupled to said control circuit, wherein said program directing said control circuit to generate a sequence of output signals selected by said control signal activates said speaker to generate sounds related to the game, wherein said speaker is also integrated into said hand held module.

81. The system of claim 77 wherein the receiver-decoder unit only receives data signals and does not transmit any data signals.

82. The device of claim 77 wherein the indication unit is a liquid crystal display (LCD).

83. The device of claim 77 wherein the indication unit, receiver-decoder unit, and programmable control circuit are integrated into a hand held module.

84. A method of providing an experience within an environment through the use of at least one display device having a base having a plurality of indication units thereon which illuminate when activated, wherein the environment is provided with a plurality of transmitters wherein at least two of the transmitters each emits a different non-specific broadcast receiver-decoder unit coded sequencing signal, the method comprising:
programming a plurality of animation sequences into a microprocessor control circuit in the display device;
detecting in a receiver-decoder unit in the display device the coded sequencing signal emitted by one of the at least two transmitters;
generating a sequencing control signal with said decoder-receiver unit in response to the detected coded sequencing signal;
providing the control signal to said control circuit;
generating output signals based upon said control signal; and
illuminating said indication units in the display device in a sequence determined by said output signals to provide a predetermined visual display when any said display device is within range of the one of the at least two transmitters.

85. The method of claim 84, wherein detecting the coded signal with said decoder-receiver unit further comprises detecting a coded infrared signal.

86. The method of claim 84, wherein detecting the coded signal with said decoder-receiver unit further comprises detecting the coded signal with an infrared photodiode.

87. The method of claim 84, wherein illuminating said indication units in a sequence further comprises illuminating a Light Emitting Diode.

88. The method of claim 84, wherein illuminating said indication units in a sequence further comprises illuminating a sequence of Light Emitting Diodes.

89. The method of claim 84, wherein illuminating said indication units in a sequence further comprises illuminating a pattern of Light Emitting Diodes.

90. The method of claim 84, wherein illuminating said indication units in a sequence further comprises changing the brightness of one or more Light Emitting Diodes.

91. The method of claim 84, wherein illuminating said indication units in a sequence determined by said output signals to provide a predetermined visual display further comprises illuminating a Liquid Crystal Display (LCD) screen with trivia questions and answers.

92. The method of claim 84, wherein illuminating said indication units in a sequence further comprises immediately illuminating the indication units.

93. The method of claim 84, wherein illuminating said indication units in a sequence further comprises illuminating the indication units for a specified duration of time.

94. The method of claim 84, wherein illuminating said indication units in a sequence further comprises illuminating the indication units after a specified delay period.

95. The method of claim 84, wherein illuminating said indication units in a sequence further comprises repeatedly illuminating the indication units.

96. The method of claim 84, wherein illuminating said indication units in a sequence further comprises illuminating said indication units based on a location in the entertainment environment that has been visited by a guest.

97. The method of claim 84, further comprising incorporating illuminated indication units into a mass audience effect.

98. The method of claim 84, further comprising synchronizing the illuminated indication units with a parade.

99. The method of claim 84, further comprising synchronizing the illuminated indication units with a fireworks display.

100. The method of claim 84, further comprising providing an interaction between a guest and a prop related to the environment.

101. The method of claim 84, further comprising providing an interaction between a guest and a character of the environment.

102. The method of claim 84, further comprising providing an interaction between a guest and an information booth.

103. The method of claim 84, further comprising incorporating said predetermined visual display into a game related to the environment.

104. The method of claim 84, further comprising providing a merchandise discount based on the illuminated indication units.

105. The method of claim 84, further comprising providing reserved seating at an attraction of the environment based on the illuminated indication units.

106. The method of claim 84, further comprising reducing wait time for an attraction based on the illuminated indication units.

107. The method of claim 84, further comprising providing control to a user to decide when the predetermined visual display will be activated.

108. The method of claim 107, wherein providing control to the user further comprises providing control to the user through a capacitive proximity switch.

109. The method of claim 108, further comprising:
coupling said capacitive proximity switch to said programmable control circuit; and
generating a presence signal in response to an object approaching or contacting a predefined area, the presence signal indicating to said programmable control circuit that said predetermined visual display should be provided by said indication units.

110. The method of claim 84, further comprising coordinating the predetermined visual display resulting from the illumination of said indication units with a central control system.

111. The method of claim 84 wherein the receiver-decoder unit only receives data signals and does not transmit any data signals.

* * * * *